United States Patent
Hahn

(10) Patent No.: US 10,638,376 B2
(45) Date of Patent: Apr. 28, 2020

(54) RAN BASED GATEWAY FUNCTIONS

(71) Applicant: NOKIA SOLUTIONS AND NETWORKS GMBH & CO. KG, Munich (DE)

(72) Inventor: Wolfgang Hahn, Bergfelde (DE)

(73) Assignee: NOKIA SOLUTIONS AND NETWORKS MANAGEMENT INTERNATIONAL GMBH, Munich (DE)

( * ) Notice: Subject to any disclaimer, the term of this patent is extended or adjusted under 35 U.S.C. 154(b) by 98 days.

(21) Appl. No.: 15/123,046

(22) PCT Filed: Mar. 4, 2014

(86) PCT No.: PCT/EP2014/054132
§ 371 (c)(1),
(2) Date: Sep. 1, 2016

(87) PCT Pub. No.: WO2015/131926
PCT Pub. Date: Sep. 11, 2015

(65) Prior Publication Data
US 2017/0078927 A1 Mar. 16, 2017

(51) Int. Cl.
*H04W 36/00* (2009.01)
*H04W 36/08* (2009.01)
(Continued)

(52) U.S. Cl.
CPC ... *H04W 36/0033* (2013.01); *H04W 36/0005* (2013.01); *H04W 36/0016* (2013.01); *H04W 36/08* (2013.01); *H04W 36/385* (2013.01); *H04W 40/36* (2013.01); *H04L 41/12* (2013.01)

(58) Field of Classification Search
CPC ... H04W 40/36; H04W 36/385; H04W 36/08; H04W 36/0005; H04W 36/0033
See application file for complete search history.

(56) References Cited

U.S. PATENT DOCUMENTS

| | | | |
|---|---|---|---|
| 2004/0063429 A1* | 4/2004 | Igarashi | H04W 36/12 455/436 |
| 2008/0192668 A1* | 8/2008 | Okubo | H04L 45/04 370/312 |

(Continued)

FOREIGN PATENT DOCUMENTS

| | | |
|---|---|---|
| WO | 2013/127429 A1 | 9/2013 |
| WO | 2013/149637 A1 | 10/2013 |

(Continued)

OTHER PUBLICATIONS

3GPP TSG SA WG2 Meeting #73 (Year: 2009).*

(Continued)

*Primary Examiner* — Khaled M Kassim
*Assistant Examiner* — Syed S Ali
(74) *Attorney, Agent, or Firm* — Squire Patton Boggs (US) LLP

(57) ABSTRACT

It is provided a method, comprising binding, for a terminal, at least one of an uplink and a downlink bearer to an IP address based on a gateway context, wherein the gateway context is controlled by a control device; and at least one of buffering and idle mode handling; wherein the buffering is adapted to buffer data for the terminal during hard handover of the terminal and to forward the data to the terminal after the hard handover is completed; the idle mode handling is adapted to forward a packet received for the terminal to a control device if the gateway context does not comprise an identification of a base station to which the terminal is attached.

11 Claims, 15 Drawing Sheets

(51) Int. Cl.
*H04W 36/38* (2009.01)
*H04W 40/36* (2009.01)
*H04L 12/24* (2006.01)

(56) References Cited

U.S. PATENT DOCUMENTS

| | | | | |
|---|---|---|---|---|
| 2011/0170517 A1* | 7/2011 | Bakker | H04W 36/0033 | 370/331 |
| 2012/0163343 A1* | 6/2012 | Ahluwalia | H04L 1/1874 | 370/331 |
| 2012/0275433 A1* | 11/2012 | Chin | H04W 36/0005 | 370/331 |
| 2013/0005340 A1* | 1/2013 | Drazynski | H04W 8/186 | 455/436 |
| 2013/0053041 A1* | 2/2013 | Li | H04L 47/767 | 455/437 |
| 2014/0330971 A1* | 11/2014 | Kurose | H04L 47/00 | 709/225 |
| 2015/0131618 A1* | 5/2015 | Chen | H04W 16/02 | 370/332 |
| 2015/0173111 A1* | 6/2015 | Agarwal | H04W 8/04 | 370/329 |
| 2015/0181473 A1* | 6/2015 | Horn | H04W 36/0027 | 370/331 |
| 2016/0142970 A1* | 5/2016 | Chen | H04W 76/025 | 370/328 |
| 2016/0192256 A1* | 6/2016 | Jha | H04W 48/04 | 455/438 |
| 2016/0198049 A1* | 7/2016 | Iwai | H04M 15/66 | 455/406 |
| 2017/0034746 A1* | 2/2017 | Karlsson | H04W 36/0022 | |
| 2017/0164243 A1* | 6/2017 | Xu | H04W 36/0033 | |
| 2017/0295520 A1* | 10/2017 | Jha | H04W 36/0005 | |

FOREIGN PATENT DOCUMENTS

| | | |
|---|---|---|
| WO | WO 2013/144747 A1 | 10/2013 |
| WO | WO 2014/008427 A1 | 1/2014 |
| WO | WO 2015/001232 A1 | 1/2015 |

OTHER PUBLICATIONS

International Search Report & Written Opinion dated Feb. 5, 2015 corresponding to International Patent Application No. PCT/EP2014/054132.

Samsung: "Open issues and solution for LIPA service," 3GPP Draft; S2-094346, 3rd Generation Partnership Project (3GPP), 3GPP TSG SA WG2 Meeting #73, Jul. 6-10, 2009, Sophia-Antipolis, France, Jun. 30, 2009, XP050355875, pp. 1-10.

LG Electronics: "Closing the remaining open issues on LIPA with local PDN connection," 3GPP Draft; S2-097472_WAS7466_WAS7242_WAS6570_LIPA, 3rd Generation Partnership Project (3GPP), 3GPP TSG SA WG2 Meeting #76, Nov. 16-20, 2009, San Jose Del Cabo, Mexico, Nov. 21, 2009, XP050432519, pp. 1-14.

3GPP TS 23.401 V11.6.0 (Jun. 2013), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 11), Jun. 24, 2013, XP050692742, pp. 1-286.

Shanmugalingam Sivasothy et al: "Programmable Mobile Core Network" 2014 IEEE Symposium on Computers and Communications Workshops Jun. 23, 2014; pp. 1-7 XP032649803 section III. C and D.

Basta Arsany et al: "A Virtual SDN-Enabled LTE EPC Architecture: A Case Study for S-/P-Gateways Functions", 2013 IEEE SDN for Future Networks and Services (SDN4FNS), IEEE, Nov. 11, 2013 (Nov. 11, 2013), pp. 1-7, XP032540949, section II-V.

Kostas Pentikousis et al: "Mobileflow: Toward software-defined mobile networks", IEEE Communications Magazine, IEEE Service 21,22 Center, Piscataway, US, vol. 51, No. 7, Jul. 1, 2013 (Jul. 1, 2013), XP011519224, ISSN: 0163-6804, pp. 46-50.

Georg Hampel et al: "Applying Software-Defined Networking to the telecom domain",Computer Communications Workshops (INFOCOMWKSHPS), 2013 IEEE Conference on, IEEE, Apr. 14, 2013 (Apr. 14, 2013), pp. 133-138, XP032436447, ISBN: 978-1-4799-0055-8 sections II et III.

3GPP TS 32.240 V12.3.0 (Dec. 2013) Technical Specification 3rd Generation Partnership Project; Technical Specification Group Services and System Aspects; Telecommunication management; Charging management; Charging architecture and principles (Release 12).

3GPP TS 23.401 V12.3.0 (Dec. 2013) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 12).

\* cited by examiner

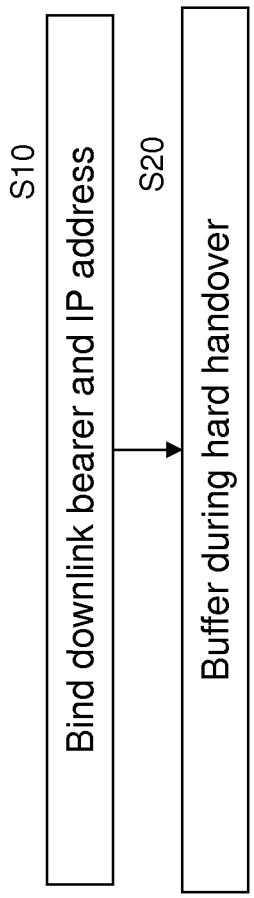
Fig. 10
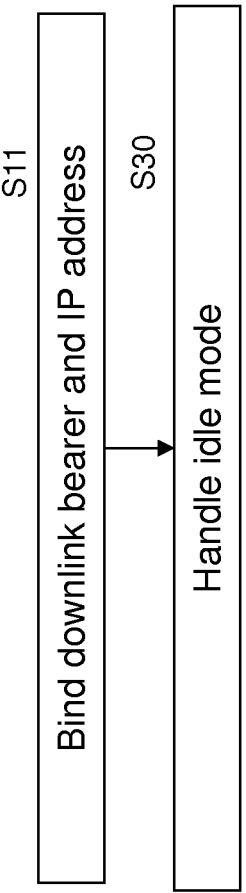
Fig. 12
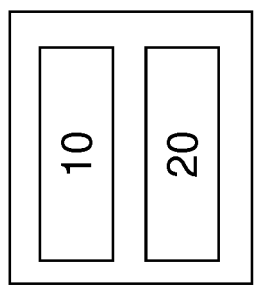
Fig. 9
Fig. 11

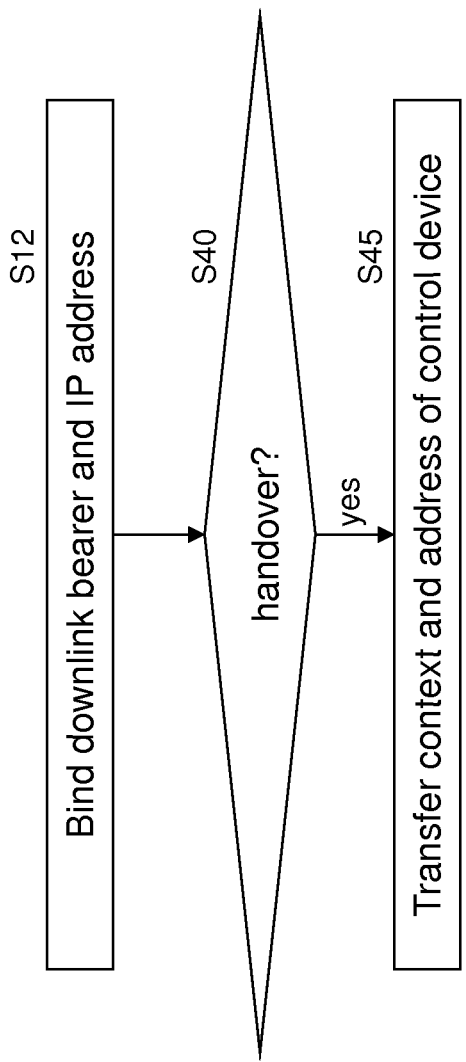
Fig. 14
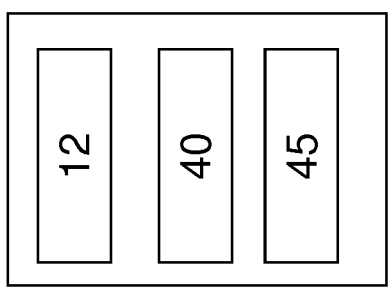
Fig. 13
Fig. 16
Fig. 15

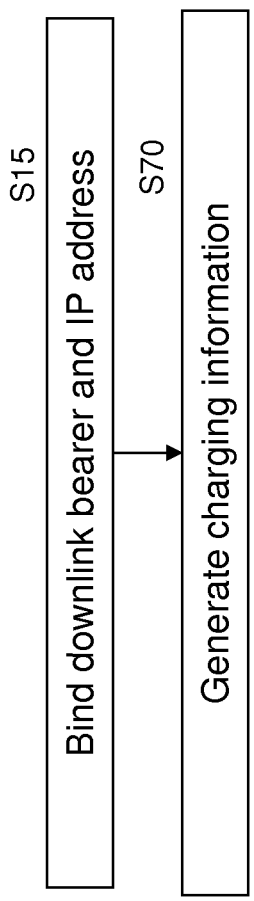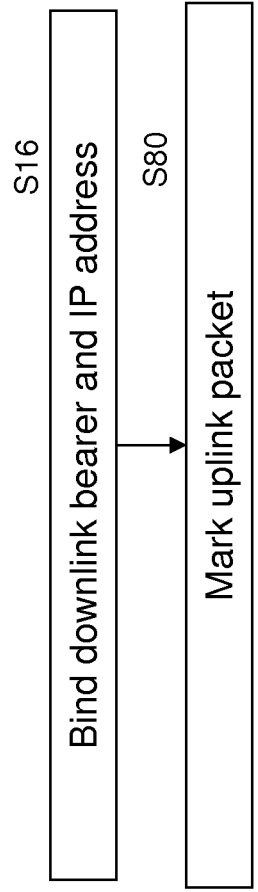

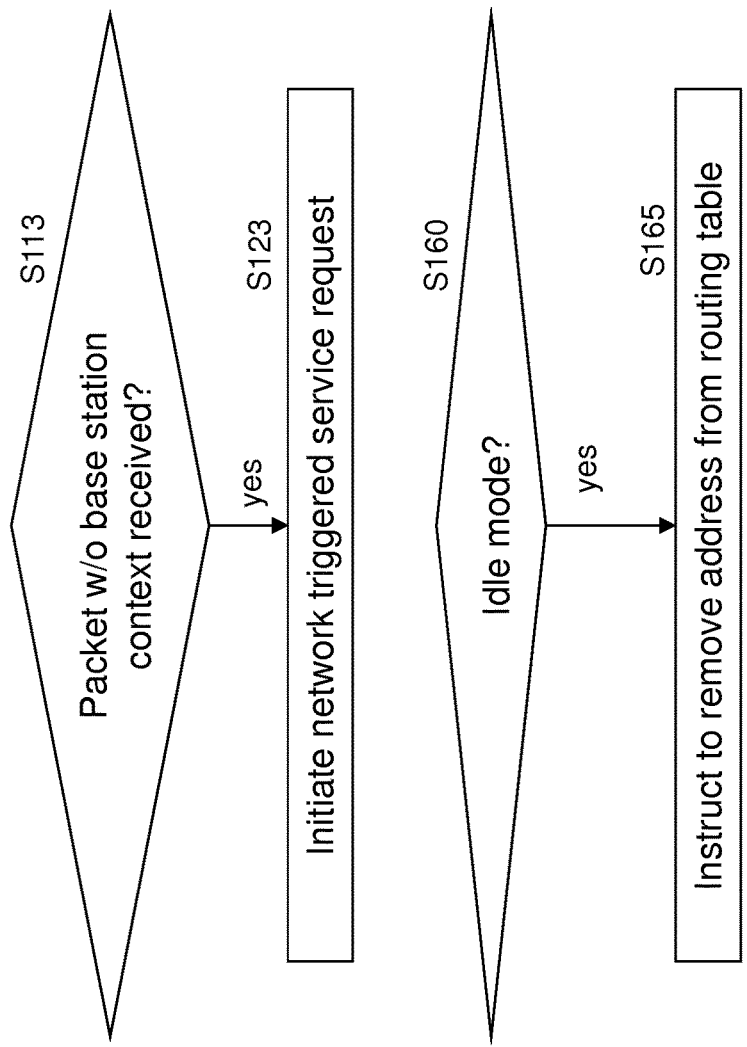
Fig. 30
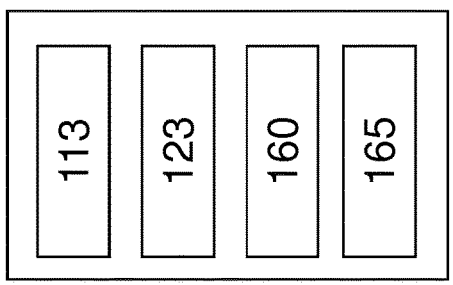
Fig. 29
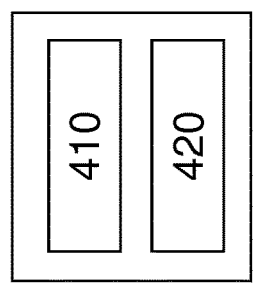
Fig. 31

RAN BASED GATEWAY FUNCTIONS

FIELD OF THE INVENTION

The present invention relates to an apparatus, a method, and a computer program product related to data communication. More particularly, the present invention relates to an apparatus, a method, and a computer program product related to RAN based gateway functions.

BACKGROUND OF THE INVENTION

Abbreviations

3GPP 3$^{rd}$ Generation Partnership Project
AAA Authentication, Authorization, Accounting
Ack Acknowledge
AMBR Aggregate Maximum Bit Rate
API Application Programming Interface
APN Access Point Name
ASPN Application Service Platform for networks
BS Base Station
BTS Base Transceiver Station
CDN Content Delivery Network
CP Control Plane
Ctrl Control
DHCP Dynamic Host Configuration Protocol
DL Downlink
DNS Domain Name System
DSCP Differentiated Services Code Point
DSP Digital Signaling Processor
eNB evolved NodeB
EPC Evolved Packet Core
EPS Evolved Packet System, LTE RAN and EPC
GBR Guaranteed Bit Rate
GPRS General Packet Radio Service
GSM Global System for Mobile Communications
GTP GPRS Tunneling Protocol
GW Gateway
HO Handover
HW Hardware
IP Internet Protocol
LGW Local Gateway
LIPA Local IP Access
LTE Long-Term Evolution
LTE-A LTE advanced
MME Mobility Management Entity
MNO Mobile Network Operator
OF OpenFlow
OFCS Offline Charging System
PCC Policy and Charging Control
PCRF Policy and Charging Rules Function
PDN Packet Data Network
PGW PDN Gateway
PMIP Proxy Mobile IP
QCI QoS Class Identifier
QoS Quality of Service
RAGS Radio Application Cloud Server
RAN Radio Access Network
Req Request
RFC Request for Comments
SDF Service Data Flow
SDN Software Defined Networking
SGW Serving Gateway
SW Software
TS Technical Specification
TT Tunnel Termination device
UE User Equipment
UL Uplink
UP User Plane
WiFi Wireless Fidelity An exponential data traffic growth is ongoing and predicted for mobile networks. To cope with this growth an increased number of small cells is an option. Also optimizations for the EPC network architecture are proposed in different research activities such as in the MEVICO project. The resulting requirements may be fulfilled by e.g. mobility anchors, gateway functions, network management, several control functions, cloud computing and virtualization, or a combination thereof.

For Femto Cells, 3GPP has an ongoing work item LIMO-NET with a local GW.

The SIGMONA project has the target to especially investigate the impact and potential of SDN and cloud technologies for mobile networks.

Centralization of network management and control functions and SDN technologies in the Transport networks are discussed in particular with respect to the following items:

Allows for network elasticity and flexibility to cope with changing traffic demands by more dynamically "programming" the transport network paths;

Centralized controllers can result in higher HW utilization like in cloud computing environments;

It promises cost efficiency of future networks e.g. due to network/resource sharing;

The Open Flow protocol was designed to standardize a further separation of control and user plane functions in transport networks that may allow for further cost savings:

Network nodes for routing and switching may become less expensive as they provide only simple standardized functionality;

decision making using information of the whole network view.

Due to cloud computing and virtualization, network functions (especially for control) may run without specialized HW as SW in data centers in cloud frameworks. At Mobile World Congress 2013, Nokia Siemens Networks™ (the predecessor of Nokia Solutions and Networks™, both abbreviated as NSN) has launched "Liquid Applications". It is provided a new Radio Applications Cloud Server (RAGS), which is integrated with NSN's Flexi BTS. It leverages IBM™'s WebSphere Application Service Platform for Networks (ASPN) platform to provide a "standards-based cloud runtime environment" that enables localized processing, content storage, and access to real-time radio and network information in the base station. This enables the base stations as a platform for new service creation and hosting network functions formally concentrated in the EPC core.

In the MEVICO project, the approach was to redesign the GWs into a centralized control part and a distributed GW that is based on SDN/OF switches and a mobility tunnel termination. Such solutions have been also proposed at SDN conferences. However, such a solution has a number of drawbacks:

It has not yet sufficiently answered where the sophisticated GW functions like charging and policy control are running as the UP GW is designed as a simple SDN switch to achieve cost advantages The GW split into GW-control and GW-user plane (switch) requires a complete redesign of the current 3GPP SGW and PGW. This introduces a high barrier for introducing the concept in real products If the merge of GW-U-Plane with SDN based transport will ever happen or in what time in the future is difficult to predict A more efficient network architecture has to be found that avoids those issues.

In 3GPP Releases 10 to 12 for Femto BS, a concept of co-locating a local GW (LGW) with the Femto BS has been introduced (LIPA). It has been also discussed to use a local mobility anchor. But finally in Rel.12 LIMONET work item, the requirement for mobility was removed. The LIPA function is limited to Home-eNB (Femto Cells) that require users to have special subscription (CSG—closed subscriber group).

SUMMARY OF THE INVENTION

It is an object of the present invention to improve the prior art.

According to a first aspect of the invention, there is provided an apparatus, comprising binding means adapted to bind, for a terminal, at least one of an uplink and a downlink bearer to an internet protocol address based on a gateway context, wherein the gateway context is controlled by a control device; and at least one of a buffering means; an idle mode handling means; a combination of a handover supervising means and a transfer means; a combination of a handover monitoring means, a context building means, and a context control means; an enforcement means; a charging means; and a marking means, wherein the buffering means is adapted to buffer data for the terminal during hard handover of the terminal and to forward the data to the terminal after the hard handover is completed; the idle mode handling means is adapted to forward a packet received for the terminal to a control device if the gateway context does not comprise an identification of a base station to which the terminal is attached; the handover supervising means is adapted to supervise if the terminal is handed over to a target base station device; the transfer means is adapted to transfer, if the handover supervising means supervises that the terminal is handed over, the gateway context and an address of the control device to the target base station device; the handover monitoring means is adapted to monitor if the terminal is handed over from a source base station device to the apparatus and if a context information for the terminal and an address of the control device is received from the source base station; the context building means is adapted to build the gateway context for the terminal based on the received context information; the context control means is adapted to let the gateway context being controlled by the control device; the enforcement means is adapted to enforce a policy rule comprised by the gateway context for the terminal; the charging means is adapted to generate charging information for the terminal based on a charging rule comprised by the gateway context; and the marking means is adapted to mark an uplink packet according to a network to which the uplink packet is directed.

The apparatus may further comprise at least one of assigning means adapted to assign an address to the terminal based on an assigning rule comprised by the gateway context; filtering means adapted to filter a packet related to the terminal based on a filter rule comprised by the gateway context; intercepting means adapted to intercept a packet related to the terminal based on an interception rule comprised by the gateway context; and screening means adapted to screen a packet related to the terminal based on a screening rule comprised by the gateway context.

The apparatus may be inhibited from providing a mobility anchor functionality.

The apparatus may further comprise routing means adapted to route uplink traffic to a mobility anchor, wherein an address of the mobility anchor is received from the control device different from the mobility anchor.

According to a second aspect of the invention, there is provided an apparatus, comprising binding processor adapted to bind, for a terminal, at least one of an uplink and a downlink bearer to an internet protocol address based on a gateway context, wherein the gateway context is controlled by a control device; and at least one of a buffering processor; an idle mode handling processor; a combination of a handover supervising processor and a transfer processor; a combination of a handover monitoring processor, a context building processor, and a context control processor; an enforcement processor; a charging processor; and a marking processor, wherein the buffering processor is adapted to buffer data for the terminal during hard handover of the terminal and to forward the data to the terminal after the hard handover is completed; the idle mode handling processor is adapted to forward a packet received for the terminal to a control device if the gateway context does not comprise an identification of a base station to which the terminal is attached; the handover supervising processor is adapted to supervise if the terminal is handed over to a target base station device; the transfer processor is adapted to transfer, if the handover supervising processor supervises that the terminal is handed over, the gateway context and an address of the control device to the target base station device; the handover monitoring processor is adapted to monitor if the terminal is handed over from a source base station device to the apparatus and if a context information for the terminal and an address of the control device is received from the source base station; the context building processor is adapted to build the gateway context for the terminal based on the received context information; the context control processor is adapted to let the gateway context being controlled by the control device; the enforcement processor is adapted to enforce a policy rule comprised by the gateway context for the terminal; the charging processor is adapted to generate charging information for the terminal based on a charging rule comprised by the gateway context; and the marking processor is adapted to mark an uplink packet according to a network to which the uplink packet is directed.

The apparatus may further comprise at least one of assigning processor adapted to assign an address to the terminal based on an assigning rule comprised by the gateway context; filtering processor adapted to filter a packet related to the terminal based on a filter rule comprised by the gateway context; intercepting processor adapted to intercept a packet related to the terminal based on an interception rule comprised by the gateway context; and screening processor adapted to screen a packet related to the terminal based on a screening rule comprised by the gateway context.

The apparatus may be inhibited from providing a mobility anchor functionality.

The apparatus may further comprise routing processor adapted to route uplink traffic to a mobility anchor, wherein an address of the mobility anchor is received from the control device different from the mobility anchor.

According to a third aspect of the invention, there is provided an apparatus, comprising packet monitoring means adapted to monitor if a packet for a terminal without a base station context is received from a user plane device; initiating means adapted to initiate a network triggered service request if the packet is received; and at least one of a charging relaying means; an enforcement relaying means; a combination of a request monitoring means, a requesting means, and a responding means; and a combination of an idle mode monitoring means and a removal means; wherein the charging relaying means is adapted to relay charging information related to the terminal between the user plane device and a charging device; the enforcement relaying means is adapted to relay enforcement information related to the terminal between the user plane device and an enforcement device; the request monitoring means is adapted to monitor if a request to modify a bearer is received from a mobility management entity, wherein the request to modify comprises a first address of a base station to which a handover of the terminal took place; the requesting means is adapted to request, if the request monitoring means monitors that the request to modify is received, a path update from a control device, wherein the request for path update comprises a second address of the base station, and the second address is based on the first address; the responding means is adapted to provide to the mobility management entity, in response to the request to modify, an address of a mobility anchor, wherein the address of the mobility anchor is based on a third address received from the control device in response to the request for path update; the idle mode monitoring means is adapted to monitor if an information is received from the mobility management entity that the terminal is in an idle mode; and the removal means is adapted to instruct the control device to remove an address of the terminal from a respective routing table of at least one of the user plane device, the mobility anchor, and another network device.

The apparatus may be inhibited from providing a gateway user plane functionality including a mobility anchor functionality.

The apparatus may further comprise the control device, wherein the control device comprises request monitoring means adapted to monitor if the request for path update is received; first informing means adapted to inform a first mobility anchor on the second address, wherein the first mobility anchor has the third address; second informing means adapted to provide the third address of the mobility anchor in response to the request for path update.

In the apparatus, the control device may further comprise calculating means adapted to calculate a second mobility anchor for the terminal based on the request for path update; third informing means adapted to inform at least one of a switch and an edge router; wherein the second informing means is adapted to provide an address of the second mobility anchor as the third address.

In the apparatus, the control device may further comprise determining means adapted to determine a route between a device having the second address and an edge router of a network based on a topology of the network, wherein a header information identifies the edge router; instructing means adapted to instruct a routing device on the route to set up a routing table such that it routes a packet comprising the header information according to the determined route.

In the apparatus, the control device may be implemented as a software defined networking control device.

According to a fourth aspect of the invention, there is provided an apparatus, comprising packet monitoring processor adapted to monitor if a packet for a terminal without a base station context is received from a user plane device; initiating processor adapted to initiate a network triggered service request if the packet is received; and at least one of a charging relaying processor; an enforcement relaying processor; a combination of a request monitoring processor, a requesting processor, and a responding processor; and a combination of an idle mode monitoring processor and a removal processor; wherein the charging relaying processor is adapted to relay charging information related to the terminal between the user plane device and a charging device; the enforcement relaying processor is adapted to relay enforcement information related to the terminal between the user plane device and an enforcement device; the request monitoring processor is adapted to monitor if a request to modify a bearer is received from a mobility management entity, wherein the request to modify comprises a first address of a base station to which a handover of the terminal took place; the requesting processor is adapted to request, if the request monitoring processor monitors that the request to modify is received, a path update from a control device, wherein the request for path update comprises a second address of the base station, and the second address is based on the first address; the responding processor is adapted to provide to the mobility management entity, in response to the request to modify, an address of a mobility anchor, wherein the address of the mobility anchor is based on a third address received from the control device in response to the request for path update; the idle mode monitoring processor is adapted to monitor if an information is received from the mobility management entity that the terminal is in an idle mode; and the removal processor is adapted to instruct the control device to remove an address of the terminal from a respective routing table of at least one of the user plane device, the mobility anchor, and another network device.

The apparatus may be inhibited from providing a gateway user plane functionality including a mobility anchor functionality.

The apparatus may further comprise the control device, wherein the control device comprises request monitoring processor adapted to monitor if the request for path update is received; first informing processor adapted to inform a first mobility anchor on the second address, wherein the first mobility anchor has the third address; second informing processor adapted to provide the third address of the mobility anchor in response to the request for path update.

In the apparatus, the control device may further comprise calculating processor adapted to calculate a second mobility anchor for the terminal based on the request for path update; third informing processor adapted to inform at least one of a switch and an edge router; wherein the second informing processor is adapted to provide an address of the second mobility anchor as the third address.

in the apparatus, the control device may further comprise determining processor adapted to determine a route between a device having the second address and an edge router of a network based on a topology of the network, wherein a header information identifies the edge router; instructing processor adapted to instruct a routing device on the route to set up a routing table such that it routes a packet comprising the header information according to the determined route.

In the apparatus, the control device may be implemented as a software defined networking control device.

According to a fifth aspect of the invention, there is provided a method, comprising binding, for a terminal, at least one of an uplink and a downlink bearer to an internet protocol address based on a gateway context, wherein the gateway context is controlled by a control device; and at least one of buffering; idle mode handling; a combination of a handover supervising and a transferring; a combination of a handover monitoring, context building, and context controlling; enforcing; charging; and marking, wherein the buffering is adapted to buffer data for the terminal during hard handover of the terminal and to forward the data to the terminal after the hard handover is completed; the idle mode handling is adapted to forward a packet received for the terminal to a control device if the gateway context does not comprise an identification of a base station to which the terminal is attached; the handover supervising is adapted to supervise if the terminal is handed over to a target base station device; the transferring is adapted to transfer, if it is supervised that the terminal is handed over, the gateway context and an address of the control device to the target base station device; the handover monitoring is adapted to monitor if the terminal is handed over from a source base station device to an apparatus performing the method and if a context information for the terminal and an address of the control device is received from the source base station; the context building is adapted to build the gateway context for the terminal based on the received context information; the context controlling is adapted to let the gateway context being controlled by the control device; the enforcing is adapted to enforce a policy rule comprised by the gateway context for the terminal; the charging is adapted to generate charging information for the terminal based on a charging rule comprised by the gateway context; and the marking is adapted to mark an uplink packet according to a network to which the uplink packet is directed.

The method may further comprise at least one of assigning an address to the terminal based on an assigning rule comprised by the gateway context; filtering a packet related to the terminal based on a filter rule comprised by the gateway context; intercepting a packet related to the terminal based on an interception rule comprised by the gateway context; and screening a packet related to the terminal based on a screening rule comprised by the gateway context.

The method may further comprise inhibiting an apparatus performing the method from providing a mobility anchor functionality.

The method may further comprise routing uplink traffic to a mobility anchor, wherein an address of the mobility anchor is received from the control device different from the mobility anchor.

The method may be a method of a gateway.

According to a sixth aspect of the invention, there is provided a method, comprising monitoring if a packet for a terminal without a base station context is received from a user plane device; initiating a network triggered service request if the packet is received; and at least one of charging relaying; enforcement relaying; a combination of request monitoring, requesting, and responding; and a combination of idle mode monitoring and removing means; wherein the charging relaying is adapted to relay charging information related to the terminal between the user plane device and a charging device; the enforcement relaying is adapted to relay enforcement information related to the terminal between the user plane device and an enforcement device; the request monitoring is adapted to monitor if a request to modify a bearer is received from a mobility management entity, wherein the request to modify comprises a first address of a base station to which a handover of the terminal took place; the requesting is adapted to request, if it is monitored that the request to modify is received, a path update from a control device, wherein the request for path update comprises a second address of the base station, and the second address is based on the first address; the responding is adapted to provide to the mobility management entity, in response to the request to modify, an address of a mobility anchor, wherein the address of the mobility anchor is based on a third address received from the control device in response to the request for path update; the idle mode monitoring is adapted to monitor if an information is received from the mobility management entity that the terminal is in an idle mode; and the removing is adapted to instruct the control device to remove an address of the terminal from a respective routing table of at least one of the user plane device, the mobility anchor, and another network device.

The method may comprise inhibiting an apparatus performing the method from providing a gateway user plane functionality including a mobility anchor functionality.

The method may further comprise monitoring if the request for path update is received; informing a first mobility anchor on the second address, wherein the first mobility anchor has the third address; providing the third address of the mobility anchor in response to the request for path update.

The method may further comprise calculating a second mobility anchor for the terminal based on the request for path update; informing at least one of a switch and an edge router; and providing an address of the second mobility anchor as the third address.

The method may further comprise determining a route between a device having the second address and an edge router of a network based on a topology of the network, wherein a header information identifies the edge router; instructing a routing device on the route to set up a routing table such that it routes a packet comprising the header information according to the determined route.

In the method, at least one of the calculating, informing, providing, determining, and instructing may be implemented as a software defined networking.

The method may be a control method of a gateway.

According to a seventh aspect of the invention, there is provided a computer program product comprising a set of instructions which, when executed on an apparatus, is configured to cause the apparatus to carry out the method according to any one of the fifth and sixth aspects. The computer program product may be embodied as a computer-readable medium or directly loadable into a computer.

According to some embodiments of the invention, at least one of the following advantages may be achieved:

Cost savings may be realized by removing the need of specialized mobile GW nodes in the network. In detail, SGW control part may run as SW in the cloud. Most PGW functions are running in the enhanced eNB. The core network may not include mobile specific user plane nodes like SGW and PGW.

A new SDN based transport network concept may enable cost savings (e.g. due to network sharing, less expensive switches/routers . . . ) and more flexibility.

The barrier to implement SDN concepts may be dramatically reduced as SGW and PGW software can be reused to a large extent compared to existing concepts that split the GWs both in a control and user plane part, whereas the necessary modifications are limited.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein

FIG. 9 shows an apparatus according to an embodiment of the invention;

FIG. 10 shows a method according to an embodiment of the invention;

FIG. 11 shows an apparatus according to an embodiment of the invention;

FIG. 12 shows a method according to an embodiment of the invention;

FIG. 13 shows an apparatus according to an embodiment of the invention.

FIG. 14 shows a method according to an embodiment of the invention; and

FIG. 15 shows an apparatus according to an embodiment of the invention.

FIG. 16 shows a method according to an embodiment of the invention;

FIG. 19 shows an apparatus according to an embodiment of the invention.

FIG. 20 shows a method according to an embodiment of the invention;

FIG. 21 shows an apparatus according to an embodiment of the invention;

FIG. 22 shows a method according to an embodiment of the invention;

FIG. 29 shows an apparatus according to an embodiment of the invention.

FIG. 30 shows a method according to an embodiment of the invention; and

FIG. 31 shows an apparatus according to an embodiment of the invention.

DETAILED DESCRIPTION OF CERTAIN EMBODIMENTS

Figure 1:
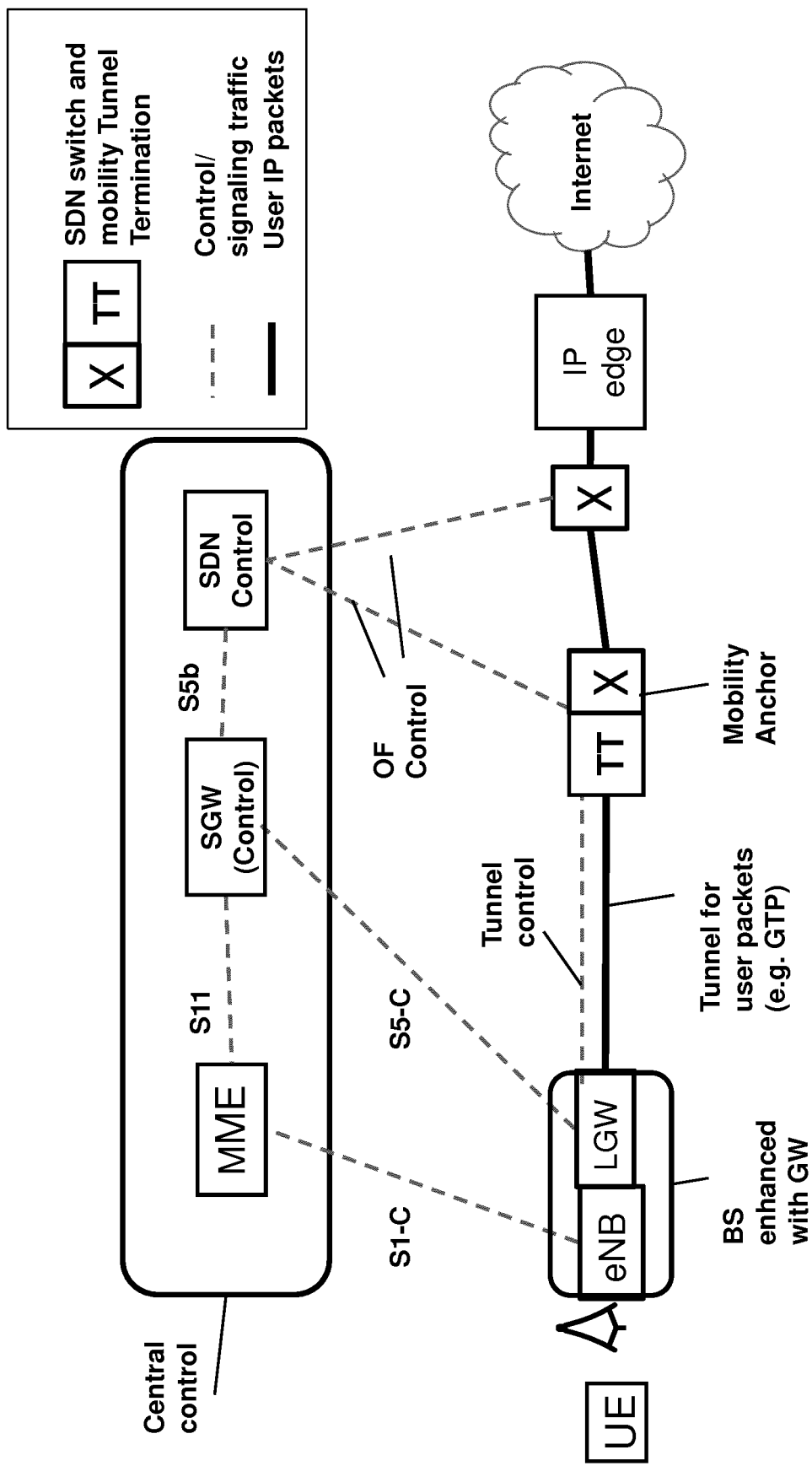
FIG. 1 shows a network architecture according to an embodiment of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

According to some embodiments of the invention, a combination of different technologies may serve the requirements of data traffic growth:

Distribution of mobility anchors and gateway functions (GWs)
   More direct/optimal routing is decreasing traffic latency and saving transport cost, in particular for local traffic (cache, CDN, mobile to mobile traffic)
   The work item LIMONET has not introduced a local mobility anchor as for residential BS a mobility anchor is seen not that important by operators.
Centralization of network management and control functions and SDN technologies in the networks (radio, core, and/or transport networks).
Cloud computing and virtualization.

The increased data traffic increases the cost pressure on operators. So, it would be beneficial to reduce the number of nodes in the user plane that need to handle all user traffic (flat network). One solution would be that all UP functions are concentrated in the eNB/RAN. If this is not fully possible due to some operator requirements for centralized core network processing or for network efficiency (mobility anchors should be not too near to the base station to avoid anchor changes or non-optimal routing) it would help for cost reduction to base the core network UP function on technologies that are not mobile network specific. This allows for higher economy of scale as the fixed network traffic is still an order of magnitude larger than the mobile network traffic.

The discussions on LIPA never touched the aspect of SDN technologies to base the mobility anchor on OF switches etc.

An advantage of the LIPA solution is that it uses for the local GW data path the SGW as signalling function only (except for one UP packet that triggers paging which is carried to the SGW. Hence, from performance point of view, it may be considered as signalling as well). This allows for easy centralization of the SGW as controller function (sometimes named SGW-C hereinafter) without totally redesigning the SW. This property is used in some embodiments of the invention. In LIPA the interface between the local GW and the SGW is an unchanged (S5) interface usually used between the SGW and PGW in the EPC. According to some embodiments of the invention this interface (termed herein S5-C) is enhanced for policy control and charging (see option 1 in Table 1 and Table 2 and FIG. 6). Another embodiment may still use an unchanged interface between the local GW and SGW. For example if policy control rules are preconfigured in the LGW or there is no support for multiple bearers and QoS differentiation and charging is performed in the IP edge (see FIG. 1) of the network.

According to some embodiments of the invention, all mobile network specific functions of the UP path are located in the eNB. This relates especially to functions for charging, policy control and QoS handling like the allocation of different traffic types to different radio bearers etc. Accordingly, the current GW functions are split by separating the mobility anchor from the local GW (LGW). In detail, the functions of a conventional 3GPP defined PGW may be modified to support a remote mobility anchor. The anchor may be located above the mobile backhaul especially for bandwidth limited links. And the anchor may be advantageously implemented by switches of an SDN network.

A mobility anchor routes UP traffic. Typically, it does not change even if the UE is handed over from one BS to another BS. Downlink traffic from the edge (from an external network such as the Internet) is first routed to the mobility anchor and from there to the UE. Thus, the node(s) at the edge do not need to know where the UE is attached.

According to some embodiments of the invention, the LGW may be implemented as a BS co-located Radio Application Cloud Server (RAGS). This way the local GW functions can be downloaded to the RAGS to enable the LGW.

BS and LGW (e.g. RAGS) may be connected via an internal interface. Thus, (at least) over the X2 interface between base stations, LGW may be reached under the same address as the corresponding base station. In some embodiments, RAGS may be completely hidden by the BS for all interfaces.

The mobility anchor may be implemented by SDN based switches, that are controlled by SDN control, e.g. using OpenFLow (OF). SDN control may be a part of SGW-C.

Figure 2:
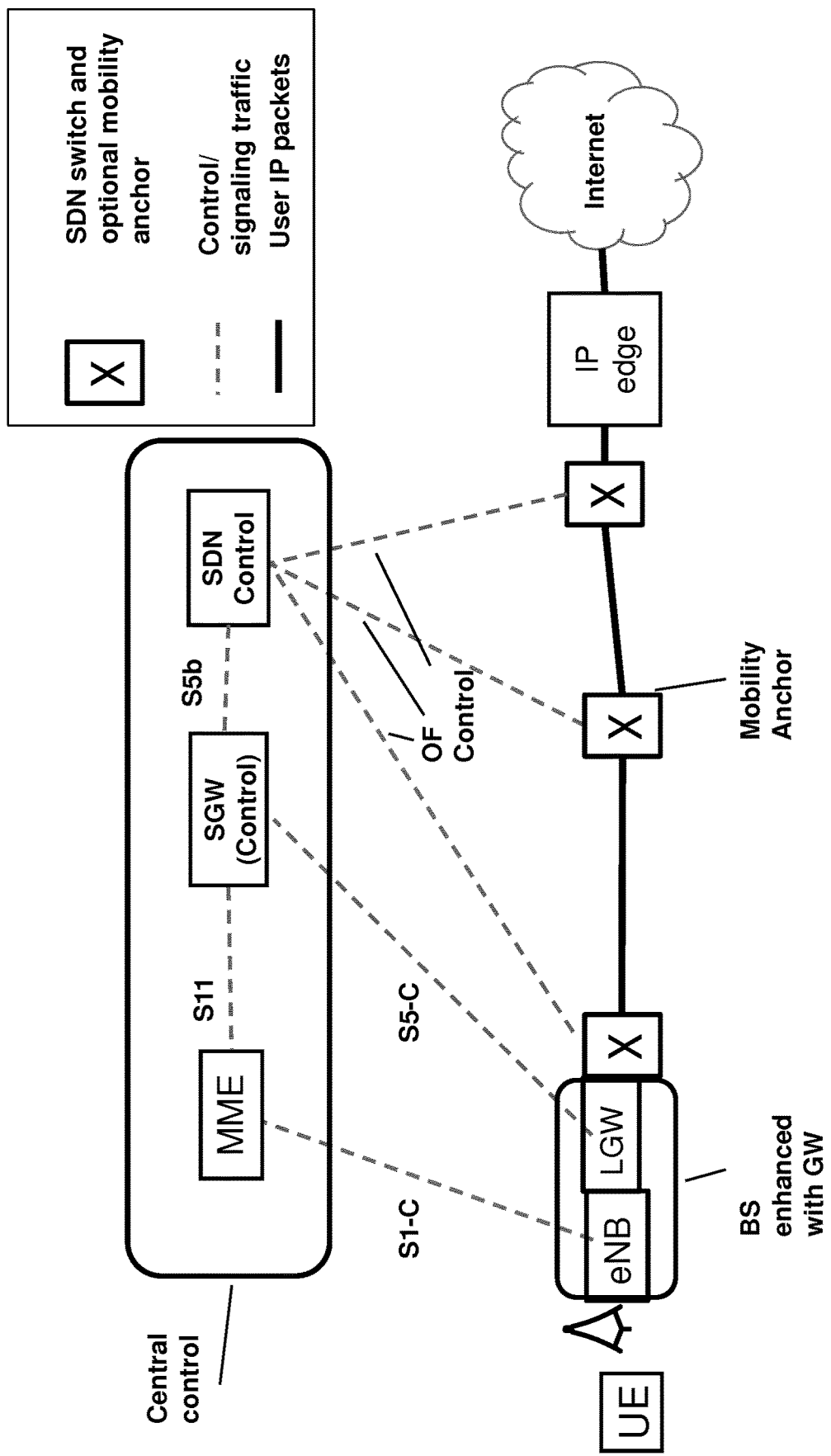
FIG. 2 shows a network architecture according to an embodiment of the invention.

FIGS. 1 and 2 show two architectures according to embodiments of the invention. These architectures are basically the same, except for the LGW and its links to SDN control and to the mobility anchor.

An UE is attached to an eNB which is combined with LGW. From LGW UP traffic goes through mobility anchor and IP edge to an external network such as the Internet (lower part of the figures). The CP in the top part of the figures comprises MME controlling eNB via S1-C interface, SGW (control) and SDN control. SGW-C (also named SGW (control)) corresponds to a conventional SGW but without user plane handling, in particular without the mobility anchor. I.e., SGW (control) does not have UP traffic (incidentally except for paging). In some embodiments of the invention, SGW (control) triggers paging when downlink data arrives for the UE in the LGW and the UE is in IDLE mode. In some embodiments of the invention, SGW (control) triggers paging when DL data arrives in other network nodes (switches, mobility anchors, IP edge) that have no routing entry for the user traffic and report the user data packet as unknown to the SDN controller. It manages and stores UE contexts, e.g. parameters of the IP bearer service, network internal routing information. In the following, SGW (control) is sometimes denoted SGW.

SGW (control) controls LGW via S5-C interface and communicates with MME via S11 interface. Mobility anchor, IP edge and potentially other switches and routers are implemented as SDN switch and are controlled by SDN control by OF control. SDN control communicates with SGW (control) via S5b interface such that SGW control can control directly SDN control and indirectly mobility anchor, IP edge and potentially other switches and routers.

According to the architecture of FIG. 1, LGW and mobility anchor are connected via transport network interfaces interface usually providing IP layer connectivity, wherein a tunnel (e.g. based on GTP) is build for user packets (UP traffic). According to the architecture of FIG. 2, LGW is at least partly implemented as SDN switch which is controlled by SDN control. Accordingly, user packets are transported as IP packets between LGW and mobility anchor without tunneling mode.

According to the architecture of FIG. 1, the switches playing the role of the mobility anchor supports (optionally) a tunneling protocol (e.g. PMIP, GTP) for switching and termination of user plane tunnels. In this case the mobility anchor may assign IP address(es) to the user. The support of GTP is preferable for backward compatibility and/or interworking reasons. This architecture has less strong requirement on the SDN signaling performance in the network than the architecture of FIG. 2.

According to the architecture of FIG. 2, in addition to the SDN switch of the mobility anchor, the BS comprises an SDN switch, too. Mobility may be fully handled by SDN network switching. In this case, the LGW may assign the IP address to the user (as conventional PGW functionality).

If further (preferably centralized) functions in the UP are needed (e.g. firewall, traffic inspection) those may be located in an IP edge node in the core network. This IP edge node is at the edge to other networks (e.g. the Internet) and may be implemented solely with functions that are not mobile specific. Thus, convergence with fixed network may be exploited.

The central control functions may be based on existing functions (MME, SGW) to a large extent. In some embodiments of the invention, the following modifications may be employed:

According to some embodiments of the invention, MME may select the SGW not based on the UE location or APN but based on e.g. a location of the SGW such that MME and SGW are in the same data center. For this, the DNS database used for GW selection has to be configured accordingly.

During connection establishment, the eNB may inform the MME on the LGW address (as defined for LIPA). MME may forward the LGW address to the SGW. After handover the new eNB may inform the MME on the new LGW address.

The SGW-C may be based on conventional SGW-SW to a large extent, too. For the UP path, only idle mode/paging related packets may be transferred on the S5-C interface between LGW and SGW-C. So it may be dimensioned as a CP element.

In addition to transferring session management messages on S11 interface to the MME and on S5-C interface to LGW, SGW may map relevant messages also to the S5b interface to the SDN controller. The protocol used may be GTP-C as on S5 interface and S11 interface. If the SDN controller supports a specific "Northbound" interface instead of GTP-C, a protocol mapping by the SGW may be required. According to some embodiments of the invention, SGW transfers at least information about the eNB address and the destination network (APN) to the SDN controller in order to allow SDN controller to select an optimal mobility anchor location in the network topology. Bearer/QoS related parameters may be used for the path selection in addition.

For mobility anchor implementation according to the architecture of FIG. 1, the SDN controller delivers back the anchor address to the SGW. The SGW forwards it to the LGW. Preferably, this message exchange is standardized.

According to some embodiments of the invention, the LGW may establish a tunnel to the mobility anchor (see FIG. 1). It could be based e.g. on GTP or PMIP, or another IP or layer 2 (e.g. carrier Ethernet) tunneling solution.

In case of the architecture of FIG. 2, the connectivity may be implemented by the SDN controller for the complete path between eNB, mobility Anchor and target network (e.g. the Internet). The SDN controller may take into account for the routing decision the load status of links or nodes or routing/transport cost of different path.

According to embodiments of the invention, the LGW may contain the user plane functions corresponding to a PGW of the EPC such as traffic policing/shaping, marking, charging etc, see Tables 1 to 3. This may require further 3GPP interfaces (Gx, Gy) not depicted in the figures, if not terminated in the SGW.

Implementation wise also a new function distribution between the eNB and the LGW/RAGS server part may be considered. E.g. the eNB might provide APIs that allows for a tighter integration of both units such that e.g. computing resources in the eNB like DSP can be used for data processing or traffic policies of the enforcement function usually located in the PGW and vice versa. This way, PGW functionality may be implemented in the eNB when assigning radio resources etc.

The collocation of LGW and eNB may affect handover. During handover, the LGW (PGW) may transfer its gateway context (state information) from one BS to another. The LGW state information (e.g. charging counters) may be transferred in HO containers in the same messages as the radio related parameters of the eNB via X2 interface between source and target eNB, or via S1-C interface in case of S1 based handover. Thus, LGW need not to be addressed separately in case of handover.

Figure 3:
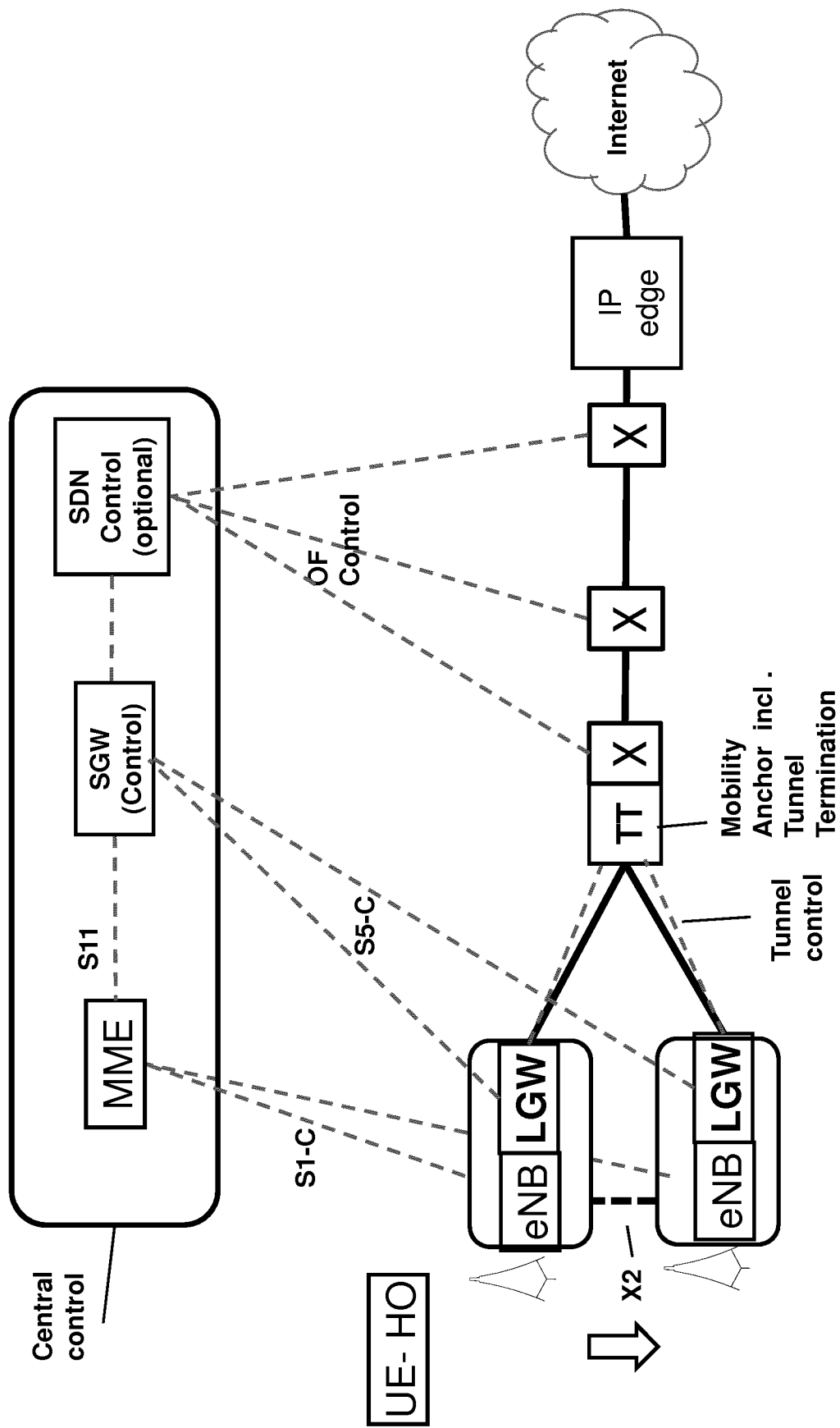
FIG. 3 shows a network architecture according to an embodiment of the invention.

FIG. 3 shows an architecture corresponding to that of FIG. 1 with a tunnel between mobility anchor and the respective LGWs of two eNBs. One or more switches including the mobility anchor and the IP edge may be located between mobility anchor and IP edge (marked by X). These switches may be controlled by SGW (control). In particular, SGW (Control) may comprise SDN Control, and the switches may be SDN switches. Then, SGW control may control the transport path between from mobility anchor to IP edge by means of SDN control using OpenFlow Control.

According to FIG. 3, a UE is handed over from the upper eNB to the lower eNB. The mobility anchor is not changed. In some embodiments of the invention, tunnel control may be performed directly between the LGW and the mobility anchor. This allows for fast switching between the old eNB/LGW and the new eNB/LGW. In some embodiments of the invention, tunnel control may be performed by SGW (control). I.e., the tunnel is switched from the upper LGW to the lower LGW at handover.

Figure 4:
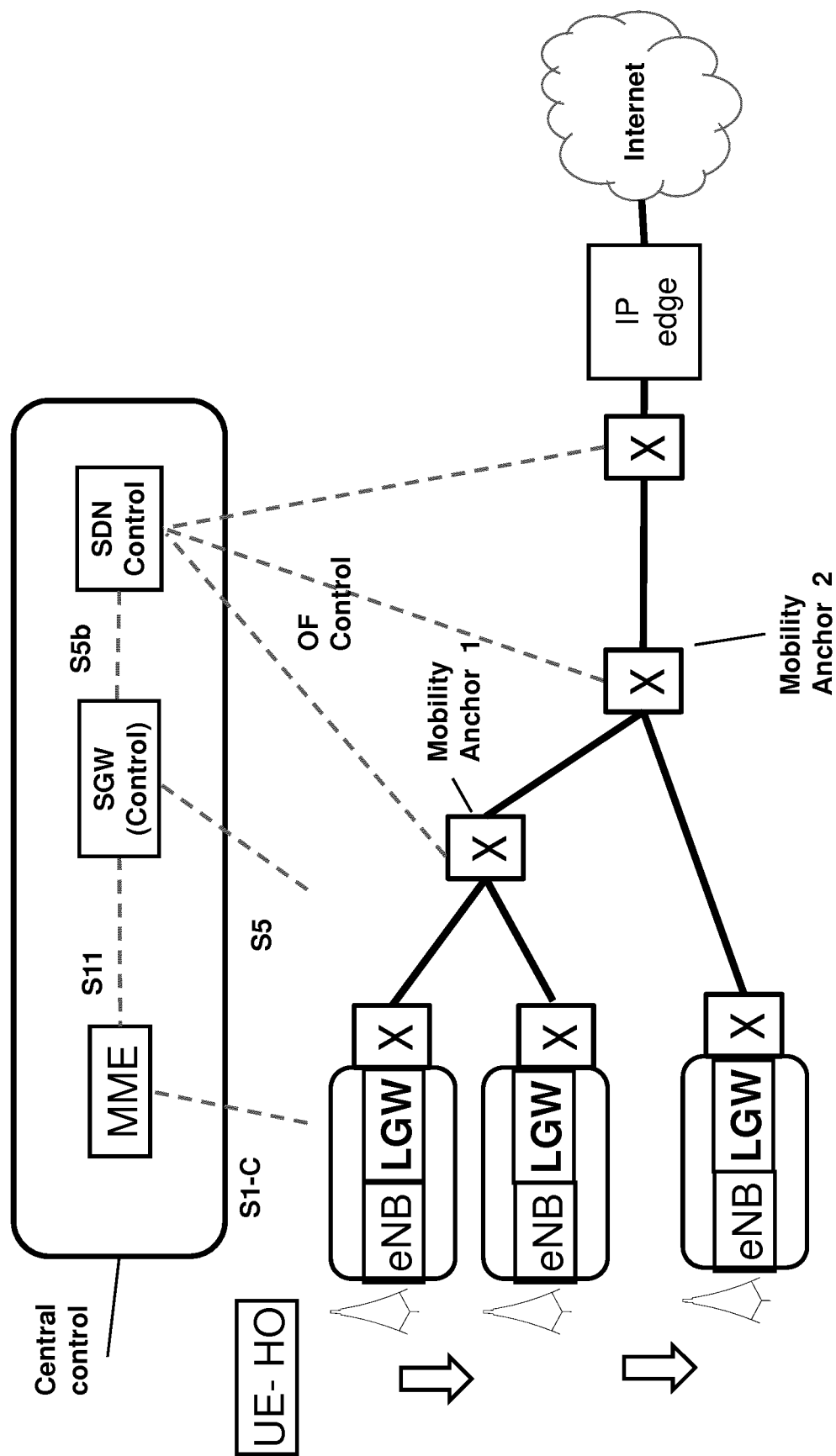
FIG. 4 shows a network architecture according to an embodiment of the invention.

FIG. 4 shows an architecture corresponding to that of FIG. 2. In addition, there are plural eNBs, and the UE is handed over from the top eNB via the middle eNB to the bottom eNB. While the UE is attached to the top and middle eNB, mobility anchor 1 acts as a mobility anchor. When the UE is handed over to the bottom eNB, SDN control, based on its knowledge of the network topology including the position of the bottom eNB calculates that the switch denoted as mobility anchor 2 would be more suitable as mobility anchor. Accordingly, at handover to the bottom eNB, the mobility anchor function is switched from mobility anchor 1 to mobility anchor 2. SDN informs IP edge, which is implemented as SDN switch, too, on the new mobility anchor if needed.

If IDLE mode is supported by the network the MME is informed by the eNB about a terminal going to idle mode and informs the SGW (Control). The SGW informs the LGW or the LGW is internally updated by the eNB. The SGW may decide to select another node in the network than the LGW to terminate the DL packet routing. For this the SDN control is informed about the IP address of the terminal. The SDN control calculates based on its knowledge of the network topology and including the last position of the terminal (the eNB) and the target network (APN) for the terminal traffic the node that shall terminate downlink routing of UP packets. This could be the IP edge or a mobility anchor. The SDN control updates the routing table in that node so that packets have no routing entry. Arriving packets will be then sent to the SDN control that initiates the downlink data notification procedure to the SGW control and MME for the MME to start paging the UE.

In some embodiments of the invention, if the user traffic is tunneled between LGW and mobility anchor like in FIG. 1, the mobility anchors are controlled to switch the tunnel. There are basically at least the following options:

If the mobility anchor has the mobility function of PGW, SGW-Ctrl may use GTP-Control to be carried via the LGW to the mobility anchor. Other PGW functions, e.g. for charging and policy control, may be in the LGW.

Direct path switch messages between LGWs and mobility anchor like with Proxy Mobile IP (PMIP).

If the mobility anchor is implemented as SDN switch, the tunnel may be switched by SDN control via OF control.

Conventionally, the APN describing the external network the user want to reach is used to determine the PGW. Plural PGWs may be assigned to one UE depending on the external networks the UE want to communicate with. Since the PGW according to some embodiments of the invention corresponds to LGW which is assigned to eNB, there is only one PGW per UE. Accordingly, according to some embodiments of the invention, for uplink routing the LGW sets a header information indicating the external network. The header information fields used may be e.g. DSCP, an IPv6 flow label, or an Ethernet VLAN option.

Figure 5:
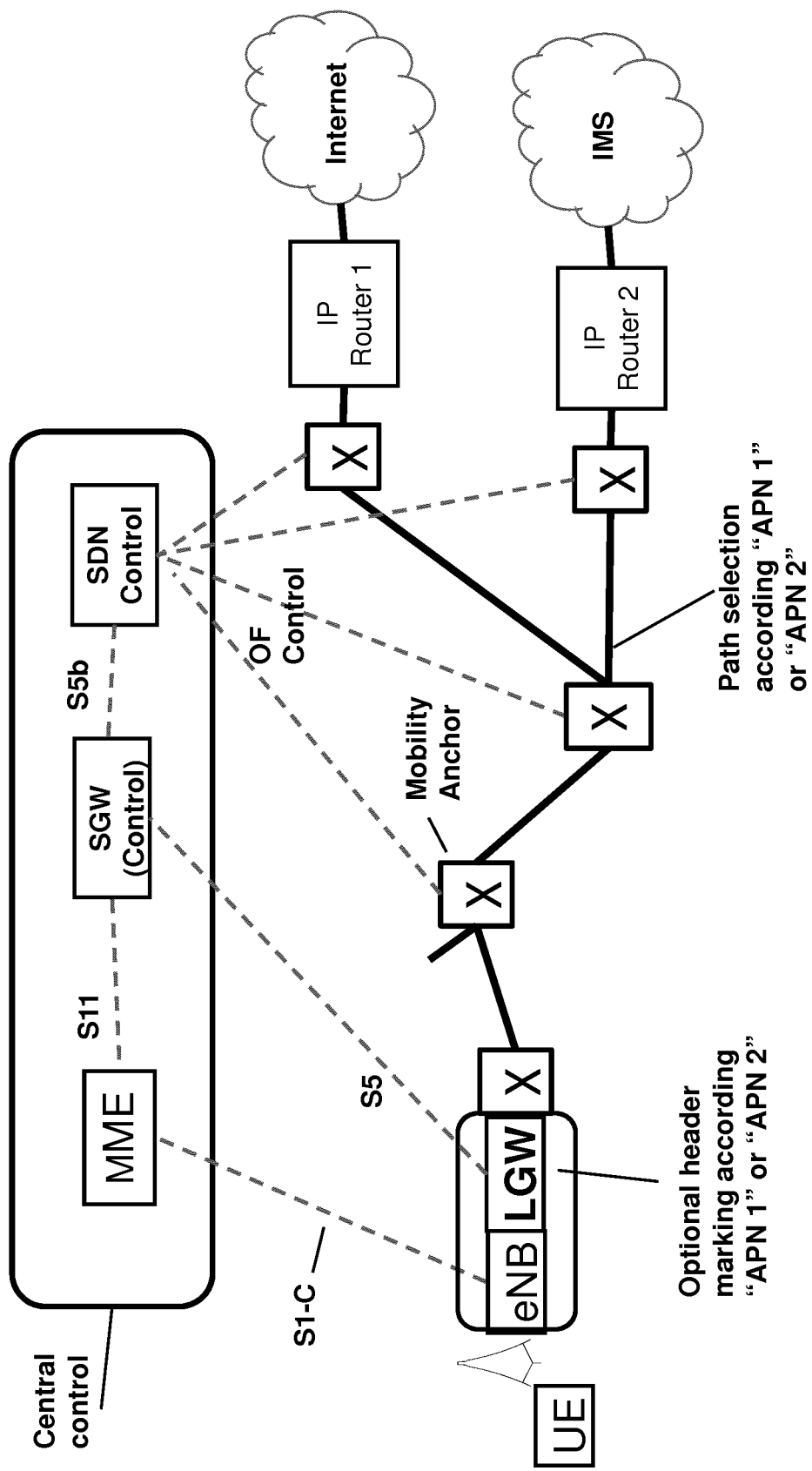
FIG. 5 shows a network architecture according to an embodiment of the invention.

FIG. 5 shows another architecture corresponding to that of FIG. 2 which is an embodiment of the invention solving the problem of APN based network selection as described above.

LGW sets header information indicating the external network the UE wants to communicate with. At least some of the nodes in the UP are configured such that they interpret the header information as APN and route the user traffic accordingly. In the architecture of FIG. 5, there are two external networks, Internet via IP router 1 and IMS via IP router 2. A node between mobility anchor and the edge routes the traffic according to the header information to IP router 1 or IP router 2. In other embodiments, mobility anchor may route the traffic according to the header information. In the decision, QoS requirements may be taken into account, too.

The routing tables in the node may be configured statically. However, as shown in FIG. 5, the nodes may be SDN switches. Then, the routing tables may be configured dynamically by SDN control. Thus, e.g. actual traffic conditions may be taken into account in the routing decision. Pre-configured rules like the described for APN based routing may help to reduce the needed signaling in the network.

The DL routing may be based on the UE IP address as long as the location of the UE does concur with the (sub-)network of the UE IP address. Deeper in the radio access network, depending on the switch settings that have been made during user data context establishment or handover, DL routing is achieved by dynamically SDN control. Dynamic SDN control may be used in particular if tunneling for UE traffic is not used and the location of the UE does not concur with the (sub-)network the UE IP address is assigned from.

Figure 6:
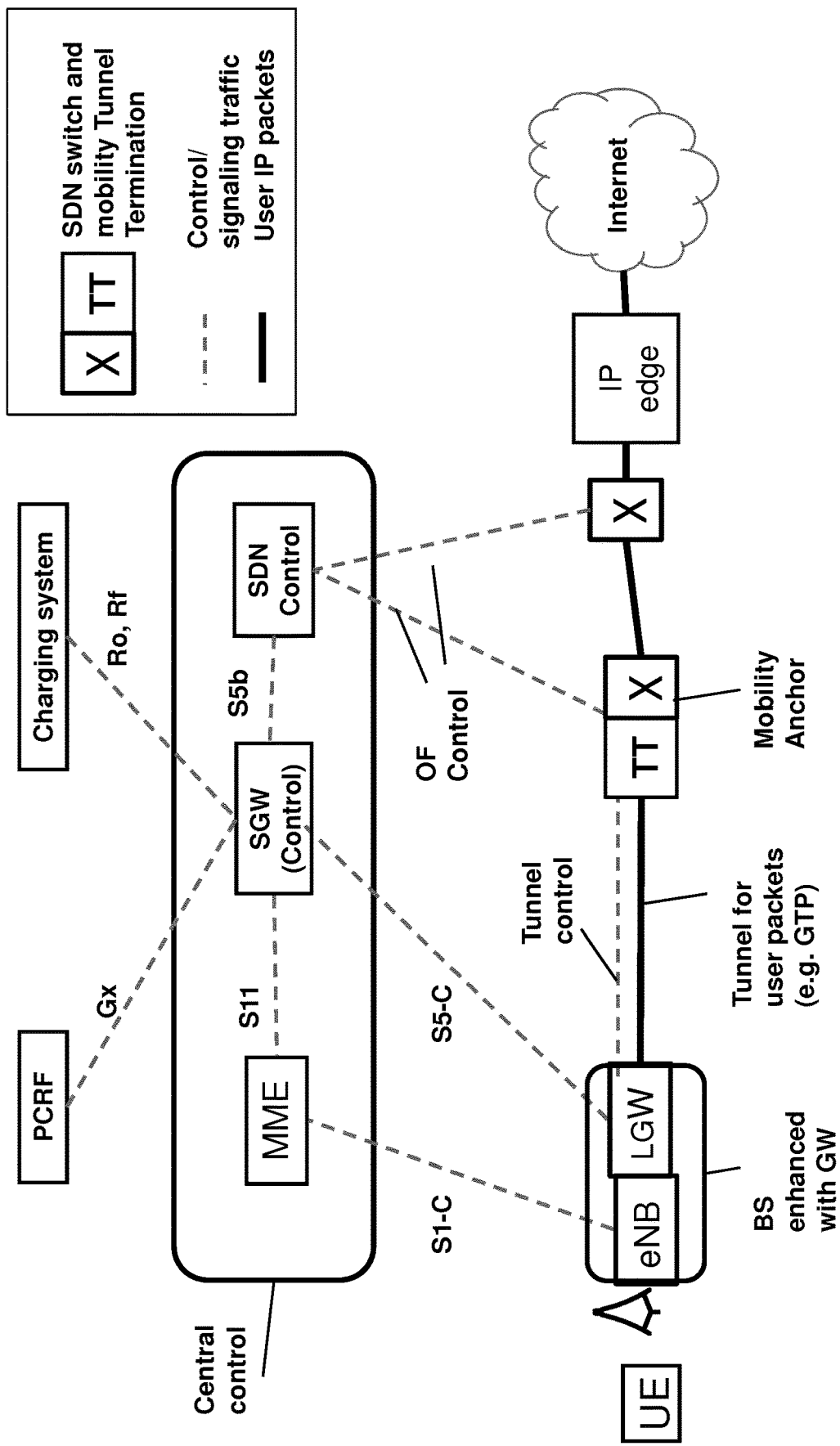
FIG. 6 shows a network architecture according to an embodiment of the invention.

FIG. 6 shows another architecture according to an embodiment of the invention. FIG. 6 corresponds to FIG. 1 with a tunnel between LGW and mobility anchor. However, corresponding embodiments of the invention (not shown) do not need a tunnel between LGW and mobility anchor such that they may correspond to FIG. 2.

In addition to FIG. 1, SGW (control) has interfaces to PCRF and a charging system such as an OFCS. SGW relays information between PCRF and/or OFCS and LGW in both directions. For example, SGW (control) may host an AAA client and map information from the LGW at the S5-C interface to respective messages of a AAA protocol.

Tables 1 to 3 show function splits according to some embodiments of the invention. Table 1 shows how functions of a conventional SGW may be split into functions of SGW-C, LGW, and mobility anchor. Correspondingly, Table 2 shows how functions of a conventional PGW may be split into functions of SGW-C, LGW, and mobility anchor. Finally, Table 3 shows new functionality resulting from the split according to embodiments of the invention. Therein, it is also mentioned that PGW selection is not required any more because the LGW (basically corresponding to the PGW) is associated to the eNB.

If a functionality is not marked, the respective entity (SGW-C, LGW, mobility anchor) according to some embodiments of the invention does not provide this functionality. Instead, if such functionality is needed, the respective entity may interface to another entity providing the functionality over an appropriate interface.

Note that some embodiments of the invention may employ all functions indicated in Tables 1 and 3. However, some embodiments may employ a subset of these functions only. For example, some embodiments may not employ charging and/or policy enforcement related functions. Also, support of hard handover and/or sending of an end marker as according to Table 1 may not be employed in some embodiments of the invention.

The policy QoS enforcement functions mentioned in the first three lines of Table 1 are relevant only if the interface between eNB and mobility anchor is PMIP based in the conventional EPC. This SGW function can be used here by the SGW-C to acquire QoS related bearer binding information from the PCRF. Also, note that Table 1 clarifies that user packets are routed by LGW and mobility anchor but not by SGW-C. While a conventional SGW is responsible for inter-operator charging, this function may be performed by LGW in some embodiments of the invention. In the same or a similar way as a conventional SGW, SGW-C initiates a network triggered service request in order to support idle mode of a UE.

TABLE 1

Split of SGW functions

| SGW functionality | SGW-C | LGW | Mobility anchor |
|---|---|---|---|
| Policy enforcement Option 1: Triggering and receiving QoS enforcement rules sent by PCRF and providing related responses to PCRF | X | | |
| Policy enforcement Option 2: Triggering and receiving QoS enforcement rules sent by PCRF and providing related responses to PCRF | | X | |
| Enforcing QoS policy rules (see e.g. 3GPP TS 23.203 and 3GPP TS 29.212) | | x | |
| Local Mobility Anchor point for inter-eNodeB handover | | | x |
| In order to ensure data integrity during hard handover, buffering and data forwarding | | x | |
| Sending of one or more "end marker" to the source eNB/LGW, e.g. immediately after switching the path during inter-eNodeB, especially to assist the reordering function in eNodeB. | | | x |
| Support of Idle mode: Treatment of packets w/o eNB context, (in LGW: forward the packet to the controller to inform the controller to initiating data downlink notification procedure; in IP edge or mobility anchor: no routing entry for the packet available, forward as unknown packet to SGW-C) | | x | x |
| Support of Idle mode: Initiation of network triggered service request procedure | x | | |
| User packet routing and forwarding; | | x | x |
| Transport level packet marking in the uplink and the downlink, e.g. setting the DiffServ Code Point, based on the QCI of the associated EPS bearer; | | x | |
| Accounting for inter-operator charging for GTP-based S5/S8 (generating accounting data per UE and bearer) | | x | |

With respect to LGW (Table 2), according to some embodiments of the invention, LGW may directly interface PCRF and/or OFCS. According to some embodiments of the invention, SGW-C may interface PCRF and/or OFCS and may relay the respective information in both directions between LGW and PCRF and/or OFCS. The relay functions are newly added and shown in Table 3. Those enhancements allow the change of the eNB and LGW during HO without changing the interfaces of the Charging system or PCRF.

The mobility anchor may act as a mobility anchor for both inter-eNodeB handover and SGW change. Note that, according to the scenario outlined in FIG. 4, the mobility anchor may change at handover, determined by SGW-C according to some embodiments of the invention. SGW-C according to some embodiments of the invention may also change the routing path, as according to the scenario outlined in FIG. 5. These new functions are indicated in Table 3. Preferably, these functions are realized such that the mobility anchor(s),

TABLE 2

Split of PGW functions

| PGW Functionality | SGW-C | LGW | Mobility anchor |
|---|---|---|---|
| Policy enforcement option 1: When a UE attaches the network setting up a Gx control session towards a PCRF to request PCC/enforcement rules etc from the PCRF (as per current TS 23.203 and TS 29.212). | X | | |
| Policy enforcement option 2: When a UE attaches the network setting up a Gx control session towards a PCRF to request PCC/enforcement rules etc from the PCRF (as per current TS 23.203 and TS 29.212). | | x | |
| Counting for CDR generation | | X | |
| UL and DL service level charging e.g. per bearer as defined in TS 23.203 (or e.g. based on SDFs defined by the PCRF, or based on deep packet inspection defined by local policy); | | x | |
| Charging Option 1: Interfacing Offline Charging System (OFCS) e.g. according to charging principles and through reference points specified in TS 32.240. | X | | |
| Charging Option 2: Interfacing OFCS e.g. according to charging principles and through reference points specified in TS 32.240 | | X | |
| UL and DL service level gating control e.g. as defined in TS 23.203; | | X | |
| UL and DL service level rate enforcement e.g. as defined in TS 23.203 (e.g. by rate policing/shaping per SDF); | | x | |
| UL and DL rate enforcement based on APN-AMBR (e.g. by rate policing/shaping per aggregate of traffic of all SDFs of the same APN that are associated with Non-GBR QCIs); | | x | |
| DL rate enforcement based on the accumulated maximum bit rate (MBRs) of the aggregate of SDFs with the same GBR QCI (e.g. by rate policing/shaping); | | x | |
| Packet screening | | x | |
| UL and DL bearer binding e.g. as defined in TS 23.203; | | x | |
| UL bearer binding verification e.g. as defined in TS 23.203; | | x | |
| Enforcing usage threshold and policy rules: If usage threshold has been exceeded or policy rules have not been met, the packet should be dropped. Threshold information should be stored in the UP function | | x | |
| IPv4 address assignment signalling via mobility manager function (e.g. MME) to the UE | X | x | |
| IPv4 address allocation, IPv6 prefix allocation for the end user, and DHCPv4 (server and client) and DHCPv6 (client and server) functions: Option 1: LGW acts as first hop router to assign an IP Address, especially for SDN based solution, may include RFC 4861 neighbour discovery for IPv6 | | x | |
| IPv4 address allocation, IPv6 prefix allocation for the end user, and DHCPv4 (server and client) and DHCPv6 (client and server) functions: Option 2: Mobility anchor acts as first hop router, especially for tunnel based mobility solution, may include RFC 4861 neighbour discovery for IPv6 | | | x |
| Local Mobility Anchor point for SGW change | | | x | edge router(s), and other switches are realized as SDN switches and SGW-C comprises a component (named e.g. SDN control) for controlling these switches by a suitable protocol such as OpenFlow.

TABLE 3

New functionalities

| New Functionality | SGW-C | LGW | Mobility anchor |
|---|---|---|---|
| Charging, option 1: SGW-C acts as a proxy and forwards accounting info received from LGW to OFCS) needs enhancements to the S5-C interface compared to conventional S5 interface. | X | | |
| Policy enforcement, option 1: Relaying QoS/ enforcement rules sent by PCRF to User Plane (LGW/PGW) and related responses sent from User Plane to PCRF (needs enhancements of the S5-C interface compared to conventional S5 interface). | X | | |
| Set header information in user plane packets based on APN | | x | |
| Definition of routing tables on path from LGW to external network peering points (edge routers) determined based on APN, (done in SGW-C if SGW-C hosts the SDN controller). | X | | |
| Determine mobility anchor, based on network topology, corresponds to MME function of SGW selection, (done in SGW-C if SGW-C hosts the SDN controller). | X | | |
| Determine downlink data traffic terminating and reporting point for idle mode terminals and modify routing tables accordingly (remove routing destination for the terminal) | | x | |
| PGW selection, e.g. based on APN (former MME function): not applicable as PGW function is included as LGW corresponding to base station | | | |

Figure 7:
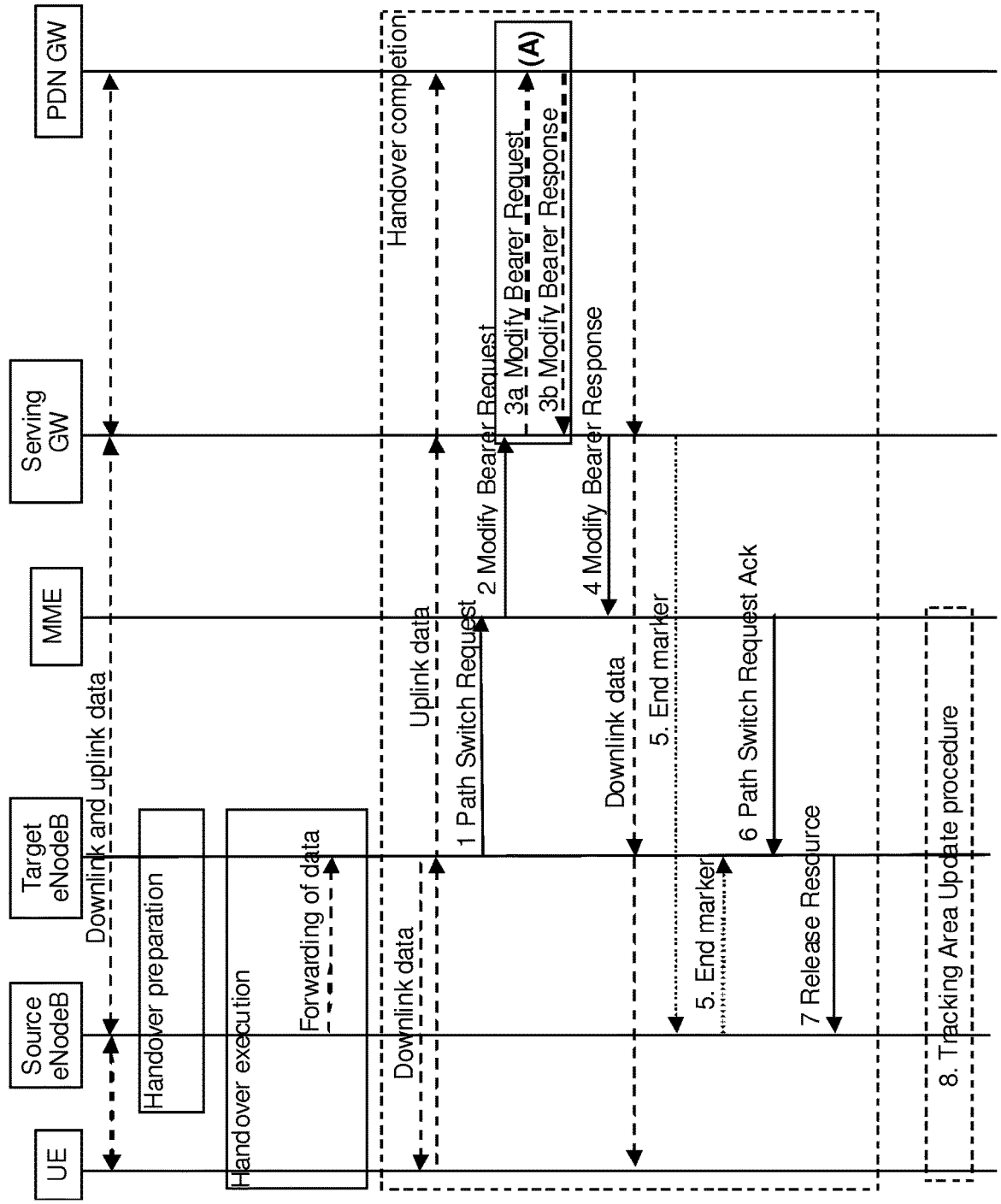
FIG. 7 shows a message flow according to 3GPP TS 23.401-c20.

FIG. 7 shows a call flow according to 3GPP TS 23.401-c20, section 5.5.1.1.2: X2-based handover without Serving GW relocation. An UE is handed over from Source eNB to Target eNB. After handover preparation, handover execution and data transfer, the following steps are performed (only the main tasks are described in this application, for further details see 3GPP TS 23.401):

1. The target eNodeB sends a Path Switch Request message to MME to inform that the UE has changed cell, including the TAI+ECGI of the target cell and the list of EPS bearers to be switched. The MME determines that the Serving GW can continue to serve the UE.

2. The MME sends a Modify Bearer Request (eNodeB address(es) and TEIDs for downlink user plane for the accepted EPS bearers) message per PDN connection to the Serving GW for each PDN connection where the default bearer has been accepted by the target eNodeB. If the Serving GW supports Modify Access Bearers Request procedure and if there is no need for the SGW to send the signalling to the PGW, the MME may send Modify Access Bearers Request (eNodeB address(es) and TEIDs for downlink user plane for the accepted EPS bearers) per UE to the Serving GW to optimize the signalling.

The MME uses the list of EPS bearers to be switched, received in step 1, to determine whether any dedicated EPS bearers in the UE context have not been accepted by the target eNodeB. The MME releases the non-accepted dedicated bearers by triggering the bearer release procedure.

3. The SGW sends the message Modify Bearer Request (Serving GW Address and TEID) per PDN connection to the PDN GW(s) concerned. The Serving GW shall return a Modify Bearer Response (Serving GW address and TEID for uplink traffic) message to the MME as a response to a Modify Bearer Request message, or a Modify Access Bearers Response (Serving GW address and TEID for uplink traffic) as a response to a Modify Access Bearers Request message.

4. The Serving GW starts sending downlink packets to the target eNodeB using the newly received address and TEIDs. A Modify Bearer Response message is sent back to the MME.

5. In order to assist the reordering function in the target eNodeB, the Serving GW shall send one or more "end marker" packets on the old path immediately after switching the path.

6. The MME confirms the Path Switch Request message with the Path Switch Request Ack message.

7. By sending Release Resource the target eNodeB informs success of the handover to source eNodeB and triggers the release of resources.

8. The UE initiates a Tracking Area Update procedure when one of several conditions applies.

Figure 8:
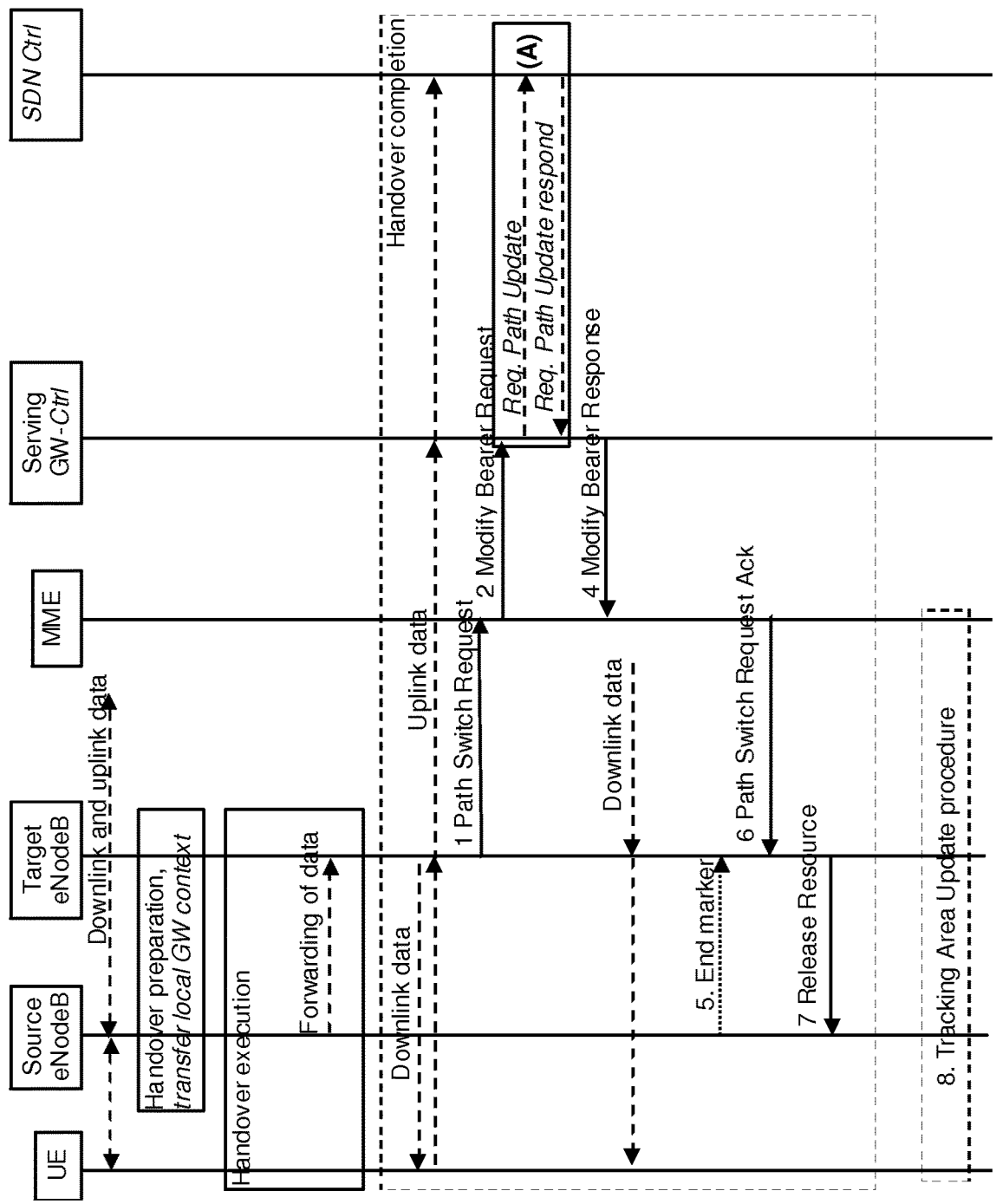
FIG. 8 shows a message flow according to an embodiment of the invention.

FIG. 8 shows a call flow according to an embodiment of the invention when a UE is handed over from Source eNB to Target eNB. The call follow is based on 3GPP TS 23.401-c20, section 5.5.1.1.2 (FIG. 7). Modifications over the conventional call flow are marked in italics, namely:

During HO preparation, the GW context is transferred from source eNB to target eNB. The GW context may comprise e.g. parameters about QoS and policy control, and/or information about charging interface(s) to be supported, and/or charging counters, etc.

The Serving GW does not have a user plane functionality (in some embodiments it still has paging functionality) but only a control plane functionality. Accordingly, it does not send downlink data in step 4. Downlink data is received from the mobility anchor not shown in FIG. 7

According to 3GPP TS 23.401-c20, SGW changes the GTP user plane tunnel endpoint address to the new eNB after it has received the modify bearer request from MME (steps 4 and 6 of FIG. 7). According to some embodiments of the invention, SGW sends a "Request Path update" message instead of a "Modify bearer request" to the SDN controller (step 3 of FIG. 7). Both of "Modify bearer request" and "Request path update" comprise an address of the target eNB. The interface between SGW and SDN controller may be named S5b interface and corresponds to the "northbound" interface of the SDN controller. This interface is not yet specified but different vendor specific implementations exist. The "Request Path update" message corresponds functionally to the "Modify bearer request" message of step 2, mapped to the protocol of the S5b interface.

Req. path update response may comprise an address of the mobility anchor in case it was changed by the SDN controller. This address is forwarded to MME in step 4. and to the LGW in step 6.

Depending on the implementation of the transport network (the UP packets can be tunnelled still like in GTP as in 3GPP specs or could be pure user IP packets identified by the IP address of the UE) and the topology of the network the SDN controller may be responsible for changing switching table entries in one or more SDN switches in the network.

FIG. 9 shows an apparatus according to an embodiment of the invention. The apparatus may be a LGW or an element thereof. FIG. 10 shows a method according to an embodiment of the invention. The apparatus according to FIG. 9 may perform the method of FIG. 10 but is not limited to this method. The method of FIG. 10 may be performed by a single apparatus such as the apparatus of FIG. 9 but is not limited to being performed by this apparatus. The apparatus (LGW) may be collocated with a base station such as an eNB. The apparatus (LGW) may be integrated with a base station such as an eNB such that the apparatus and the base station have a single address in the network. The single apparatus may be identified by a single address in the network.

The apparatus comprises binding means 10 and buffering means 20.

The binding means 10 binds, for a terminal, at least one of an uplink and a downlink bearer to an IP address based on a gateway context (S10). The gateway context is controlled by a control device such as a SGW-C.

The buffering means 20 buffers data for the terminal during hard handover of the terminal and forwards the data to the terminal after the hard handover is completed (S20).

FIG. 11 shows an apparatus according to an embodiment of the invention. The apparatus may be a LGW or an element thereof. FIG. 12 shows a method according to an embodiment of the invention. The apparatus according to FIG. 11 may perform the method of FIG. 12 but is not limited to this method. The method of FIG. 12 may be performed by a single apparatus such as the apparatus of FIG. 11 but is not limited to being performed by this apparatus. The apparatus (LGW) may be collocated with a base station such as an eNB. The apparatus (LGW) may be integrated with a base station such as an eNB such that the apparatus and the base station have a single address in the network. The single apparatus may be identified by a single address in the network.

The apparatus comprises binding means 11 and idle mode handling means 30.

The binding means 11 binds, for a terminal, at least one of an uplink and a downlink bearer to an IP address based on a gateway context (S11). The gateway context is controlled by a control device such as a SGW-C. The binding means 11 may be the same as or different from the binding means 10 of FIG. 9.

The idle mode handling means 30 forwards a packet received for the terminal to the control device if the gateway context does not comprise an identification of a base station to which the terminal is attached (S30).

FIG. 13 shows an apparatus according to an embodiment of the invention. The apparatus may be a LGW or an element thereof. FIG. 14 shows a method according to an embodiment of the invention. The apparatus according to FIG. 13 may perform the method of FIG. 14 but is not limited to this method. The method of FIG. 14 may be performed by a single apparatus such as the apparatus of FIG. 13 but is not limited to being performed by this apparatus. The apparatus (LGW) may be collocated with a base station such as an eNB. The apparatus (LGW) may be integrated with a base station such as an eNB such that the apparatus and the base station have a single address in the network. The single apparatus may be identified by a single address in the network.

The apparatus comprises binding means 12, handover supervising means 40, and transfer means 45.

The binding means 12 binds, for a terminal, at least one of an uplink and a downlink bearer to an IP address based on a gateway context (S12). The gateway context is controlled by a control device such as a SGW-C. The binding means 12 may be the same as or different from the binding means 10 of FIG. 9. The binding means 12 may be the same as or different from the binding means 11 of FIG. 11.

The handover supervising means 40 supervises if the terminal is handed over to a target base station device (S40). If the handover supervising means supervises that the terminal is handed over ("yes" in S40), the transfer means 45 transfers the gateway context and an address of the control device to the target base station device (S45).

FIG. 15 shows an apparatus according to an embodiment of the invention. The apparatus may be a LGW or an element thereof. FIG. 16 shows a method according to an embodiment of the invention. The apparatus according to FIG. 15 may perform the method of FIG. 16 but is not limited to this method. The method of FIG. 16 may be performed by a single apparatus such as the apparatus of FIG. 15 but is not limited to being performed by this apparatus. The apparatus (LGW) may be collocated with a base station such as an eNB. The apparatus (LGW) may be integrated with a base station such as an eNB such that the apparatus and the base station have a single address in the network. The single apparatus may be identified by a single address in the network.

The apparatus comprises binding means 13 and enforcement means 50.

The binding means 13 binds, for a terminal, at least one of an uplink and a downlink bearer to an IP address based on a gateway context (S13). The gateway context is controlled by a control device such as a SGW-C. The binding means 13 may be the same as or different from the binding means 10 of FIG. 9. The binding means 13 may be the same as or different from the binding means 11 of FIG. 11. The binding means 13 may be the same as or different from the binding means 12 of FIG. 13.

The enforcement means 50 enforces a policy rule for the terminal based on a policy rule comprised by the gateway context (S50).

Figure 17:
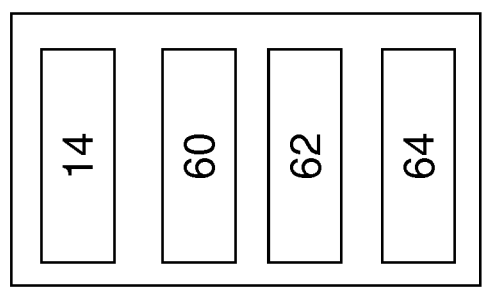
FIG. 17 shows an apparatus according to an embodiment of the invention.
Figure 18:
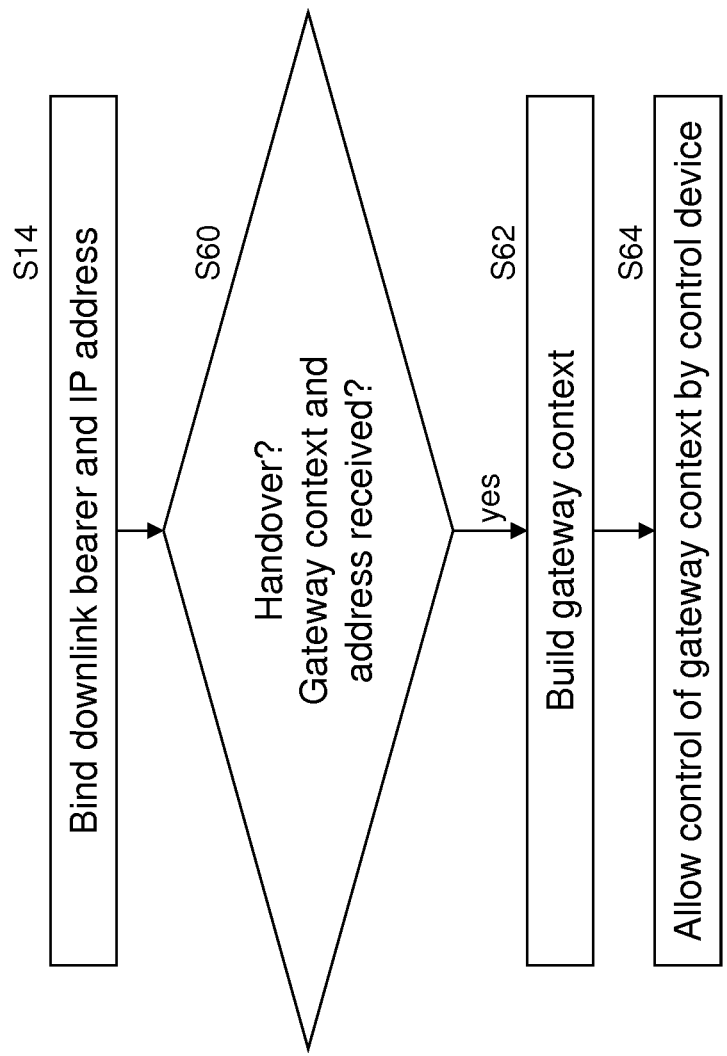
FIG. 18 shows a method according to an embodiment of the invention.

FIG. 17 shows an apparatus according to an embodiment of the invention. The apparatus may be a LGW or an element thereof. FIG. 18 shows a method according to an embodiment of the invention. The apparatus according to FIG. 17 may perform the method of FIG. 18 but is not limited to this method. The method of FIG. 18 may be performed by a single apparatus such as the apparatus of FIG. 17 but is not limited to being performed by this apparatus. The apparatus (LGW) may be collocated with a base station such as an eNB. The apparatus (LGW) may be integrated with a base station such as an eNB such that the apparatus and the base station have a single address in the network. The single apparatus may be identified by a single address in the network.

The apparatus comprises binding means 14, handover monitoring means 60, context building means 62, and context control means 64.

The binding means 14 binds, for a terminal, at least one of an uplink and a downlink bearer to an IP address based on a gateway context (S14). The gateway context is controlled by a control device such as a SGW-C. The binding means 14 may be the same as or different from the binding means 10 of FIG. 9. The binding means 14 may be the same as or different from the binding means 11 of FIG. 11. The binding means 14 may be the same as or different from the binding means 12 of FIG. 13. The binding means 14 may be the same as or different from the binding means 13 of FIG. 15.

The handover monitoring means 60 monitors if the terminal is handed over from a source base station device to the apparatus or a base station being in a bijective relationship to the apparatus and if a context information for the terminal and an address of a control device is received from the source base station (S60). The control device may be a SGW-C.

If the handover monitoring means 60 monitors that the terminal is handed over and the context information and the address of the control device are received ("yes" in S60), the context building means 62 builds a gateway context for the terminal based on the received context information (S62). The context control means 64 lets the gateway context being controlled by the control device (S64).

FIG. 19 shows an apparatus according to an embodiment of the invention. The apparatus may be a LGW or an element thereof. FIG. 20 shows a method according to an embodiment of the invention. The apparatus according to FIG. 19 may perform the method of FIG. 20 but is not limited to this method. The method of FIG. 20 may be performed by a single apparatus such as the apparatus of FIG. 19 but is not limited to being performed by this apparatus. The apparatus (LGW) may be collocated with a base station such as an eNB. The apparatus (LGW) may be integrated with a base station such as an eNB such that the apparatus and the base station have a single address in the network. The single apparatus may be identified by a single address in the network.

The apparatus comprises binding means 15 and charging means 70.

The binding means 15 binds, for a terminal, at least one of an uplink and a downlink bearer to an IP address based on a gateway context (S15). The gateway context is controlled by a control device such as a SGW-C. The binding means 15 may be the same as or different from the binding means 10 of FIG. 9. The binding means 15 may be the same as or different from the binding means 11 of FIG. 11. The binding means 15 may be the same as or different from the binding means 12 of FIG. 13. The binding means 15 may be the same as or different from the binding means 13 of FIG. 15. The binding means 15 may be the same as or different from the binding means 14 of FIG. 17.

The charging means 70 generates charging information for the terminal based on a charging rule comprised by the gateway context (S70). For example, the charging means 70 may count for CDR generation and may provide the charging information as CDR to an OFCS according to 3GPP TS 32.240.

FIG. 21 shows an apparatus according to an embodiment of the invention. The apparatus may be a LGW or an element thereof. FIG. 22 shows a method according to an embodiment of the invention. The apparatus according to FIG. 21 may perform the method of FIG. 22 but is not limited to this method. The method of FIG. 22 may be performed by a single apparatus such as the apparatus of FIG. 21 but is not limited to being performed by this apparatus. The apparatus (LGW) may be collocated with a base station such as an eNB. The apparatus (LGW) may be integrated with a base station such as an eNB such that the apparatus and the base station have a single address in the network. The single apparatus may be identified by a single address in the network.

The apparatus comprises binding means 16 and marking means 80.

The binding means 16 binds, for a terminal, at least one of an uplink and a downlink bearer to an IP address based on a gateway context (S16). The gateway context is controlled by a control device such as a SGW-C. The binding means 16 may be the same as or different from the binding means 10 of FIG. 9. The binding means 16 may be the same as or different from the binding means 11 of FIG. 11. The binding means 16 may be the same as or different from the binding means 12 of FIG. 13. The binding means 16 may be the same as or different from the binding means 13 of FIG. 15. The binding means 16 may be the same as or different from the binding means 14 of FIG. 17. The binding means 16 may be the same as or different from the binding means 15 of FIG. 19.

The marking means 80 marks an uplink packet according to a network to which the uplink packet is directed (S80). For example, the marking means 80 may set a header entry accordingly.

Figure 24:
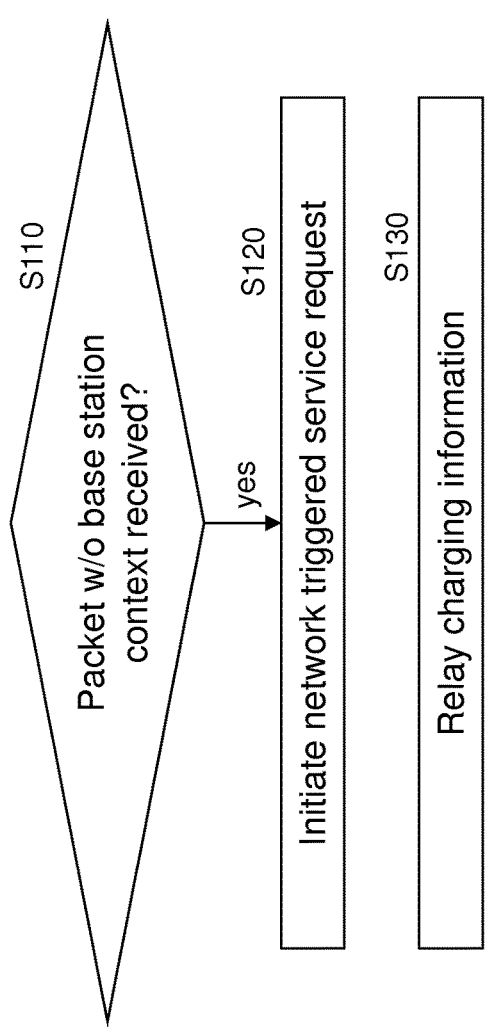
FIG. 24 shows a method according to an embodiment of the invention.
Figure 23:
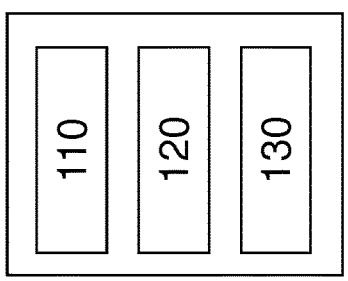
FIG. 23 shows an apparatus according to an embodiment of the invention.

FIG. 23 shows an apparatus according to an embodiment of the invention. The apparatus may be a controller such as a SGW-C or an element thereof. FIG. 24 shows a method according to an embodiment of the invention. The apparatus according to FIG. 23 may perform the method of FIG. 24 but is not limited to this method. The method of FIG. 24 may be performed by a single apparatus such as the apparatus of FIG. 23 but is not limited to being performed by this apparatus. The single apparatus may be identified by a single address in the network.

The apparatus comprises packet monitoring means 110, initiating means 120, and charging relaying means 130.

The packet monitoring means 110 monitors if a packet for a terminal without a base station context is received from a user plane device (S110). The user plane device may be a LGW, a mobility anchor, or another switch or router.

If the packet is received ("yes" in S110), the initiating means 120 initiates a network triggered service request (S120).

The charging relaying means 130 relays charging information related to the terminal between the user plane device and a charging device such as a OFCS (S130).

Figure 26:
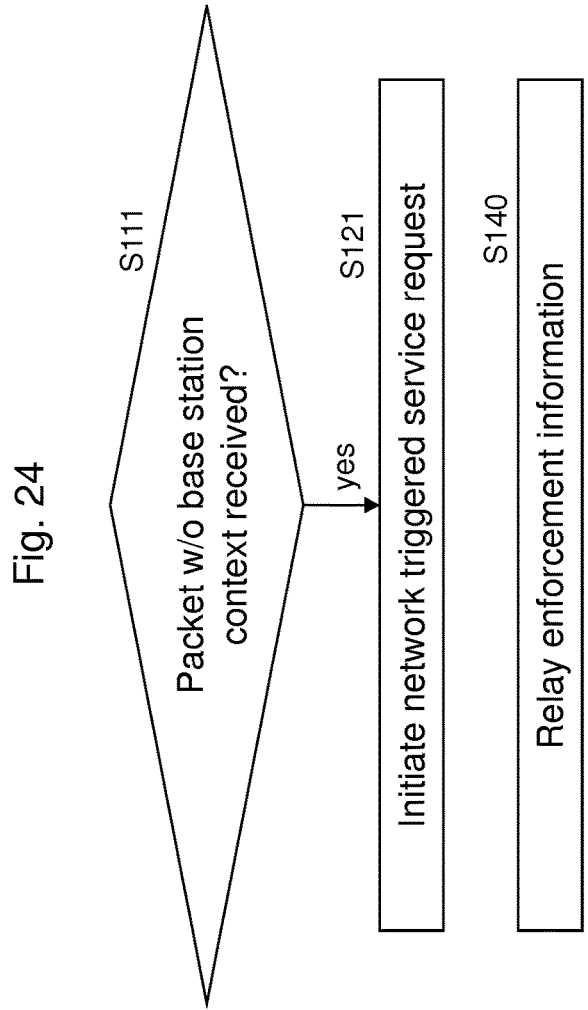
FIG. 26 shows a method according to an embodiment of the invention.
Figure 25:
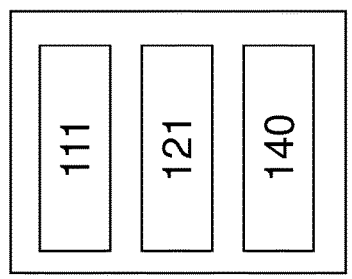
FIG. 25 shows an apparatus according to an embodiment of the invention.

FIG. 25 shows an apparatus according to an embodiment of the invention. The apparatus may be a controller such as a SGW-C or an element thereof. FIG. 26 shows a method according to an embodiment of the invention. The apparatus according to FIG. 25 may perform the method of FIG. 26 but is not limited to this method. The method of FIG. 26 may be performed by a single apparatus such as the apparatus of FIG. 25 but is not limited to being performed by this apparatus. The single apparatus may be identified by a single address in the network.

The apparatus comprises packet monitoring means 111, initiating means 121, and enforcement relaying means 140.

The packet monitoring means 111 monitors if a packet for a terminal without a base station context is received from a user plane device (S111). The user plane device may be a LGW, a mobility anchor, or another switch or router.

If the packet is received ("yes" in S111), the initiating means 121 initiates a network triggered service request (S121). Each of the packet monitoring means 111 and the initiating means 121 may be the same as or different from the packet monitoring means 110 and initiating means 120 of FIG. 23, respectively.

The enforcing relaying means 140 relays enforcement information related to the terminal between the user plane device and a policy device such as a PCRF (S140).

Figure 27:
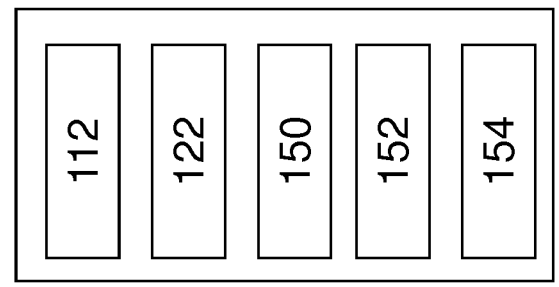
FIG. 27 shows an apparatus according to an embodiment of the invention.
Figure 28:
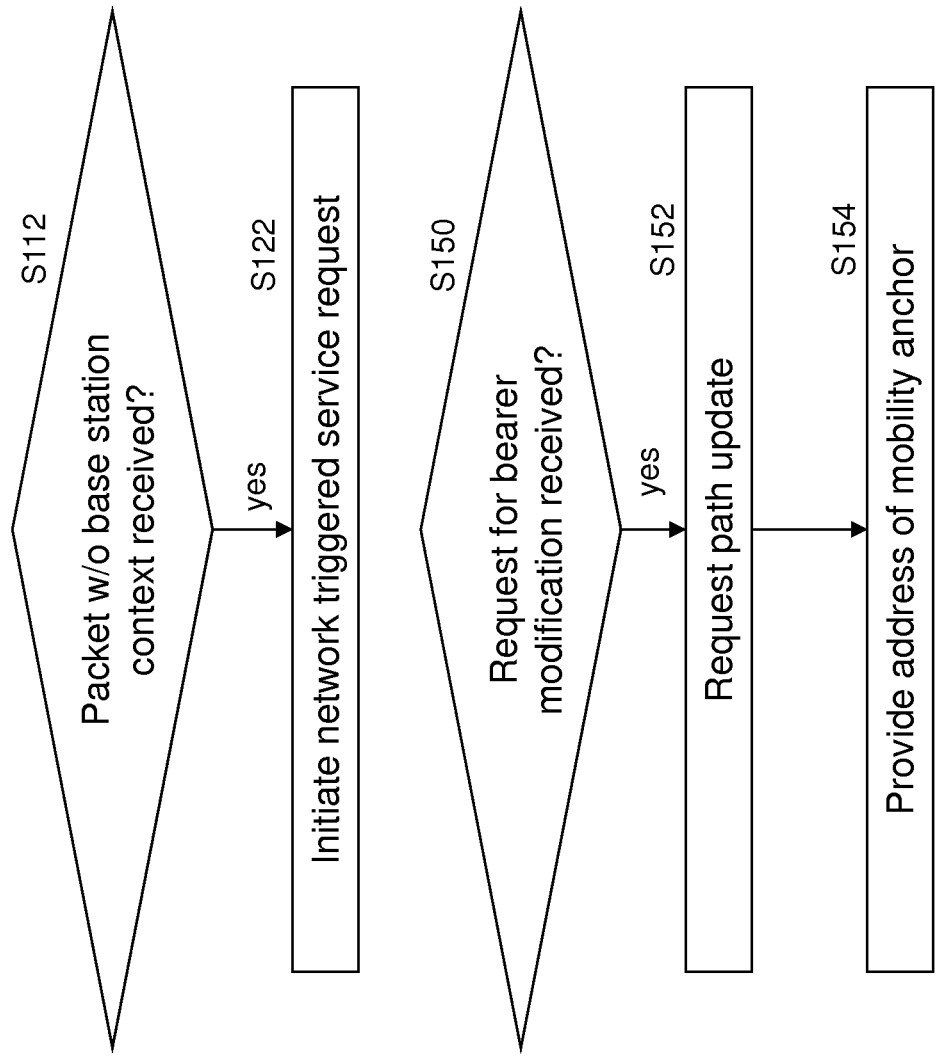
FIG. 28 shows a method according to an embodiment of the invention.

FIG. 27 shows an apparatus according to an embodiment of the invention. The apparatus may be a controller such as a SGW-C or an element thereof. FIG. 28 shows a method according to an embodiment of the invention. The apparatus according to FIG. 27 may perform the method of FIG. 28 but is not limited to this method. The method of FIG. 28 may be performed by a single apparatus such as the apparatus of FIG. 27 but is not limited to being performed by this apparatus. The single apparatus may be identified by a single address in the network.

The apparatus comprises packet monitoring means 112, initiating means 122, request monitoring means 150, requesting means 152, and responding means 154.

The packet monitoring means 112 monitors if a packet for a terminal without a base station context is received from a user plane device (S112). The user plane device may be a LGW, a mobility anchor, or another switch or router.

If the packet is received ("yes" in S112), the initiating means 122 initiates a network triggered service request (S122). Each of the packet monitoring means 112 and the initiating means 122 may be the same as or different from the packet monitoring means 110 and initiating means 120 of FIG. 23, respectively. Each of the packet monitoring means 112 and the initiating means 122 may be the same as or different from the packet monitoring means 111 and initiating means 121 of FIG. 25, respectively.

The request monitoring means 150 monitors if a request to modify a bearer is received from a mobility management entity (S150). The request to modify the bearer comprises a first address of a base station to which a handover of the terminal took place. In addition, it may comprise an indication of a bearer which is to be modified.

If the request monitoring means 150 monitors that the request to modify is received ("yes" in S150), the requesting means 152 requests a path update from a control device (S152). The request for path update comprises a second address of the base station, wherein the second address is based on the first address. The request for path update may not comprise any indication of the bearer. The control device may be a SDN controller. It may be integrated with the apparatus.

The responding means 154 provides, to the mobility management entity, in response to the request to modify the bearer, an address of a mobility anchor (S154). The address of the mobility anchor is based on a third address received from the control device in response to the request for path update.

FIG. 29 shows an apparatus according to an embodiment of the invention. The apparatus may be a controller such as a SGW-C or an element thereof. FIG. 30 shows a method according to an embodiment of the invention. The apparatus according to FIG. 29 may perform the method of FIG. 30 but is not limited to this method. The method of FIG. 30 may be performed by a single apparatus such as the apparatus of FIG. 29 but is not limited to being performed by this apparatus. The single apparatus may be identified by a single address in the network.

The apparatus comprises packet monitoring means 113, initiating means 123, idle mode monitoring means 160, and removal means 165.

The packet monitoring means 113 monitors if a packet for a terminal without a base station context is received from a user plane device (S113). The user plane device may be a LGW, a mobility anchor, or another switch or router.

If the packet is received ("yes" in S113), the initiating means 123 initiates a network triggered service request (S123). Each of the packet monitoring means 113 and the initiating means 123 may be the same as or different from the packet monitoring means 110 and initiating means 120 of FIG. 23, respectively. Each of the packet monitoring means 113 and the initiating means 123 may be the same as or different from the packet monitoring means 111 and initiating means 121 of FIG. 25, respectively. Each of the packet monitoring means 113 and the initiating means 123 may be the same as or different from the packet monitoring means 112 and initiating means 122 of FIG. 27, respectively.

The idle mode monitoring means 160 monitors if an information is received from the mobility management entity that the terminal is in an idle mode (S160).

If the idle mode monitoring means 160 monitors that the information is received ("yes" in S160), the removal means 165 instructs a control device to remove an address of the terminal from a respective routing table of at least one of the user plane device, the mobility anchor, and another network device. The control device may be a SDN controller. It may be integrated with the apparatus.

FIG. 31 shows an apparatus according to an embodiment of the invention. The apparatus comprises at least one processor 410, at least one memory 420 including computer program code, and the at least one processor, with the at least one memory and the computer program code, being arranged to cause the apparatus to at least perform at least one of the methods according to FIGS. 10, 12, 14, 16, 18, 20, 22, 24, 26, 28, and 30.

Together with re-configuring the core network (gateways, mobility anchor, other SDN switches), SDN control may also reconfigure the transport network if the corresponding nodes are implemented as SDN switches.

Embodiments of the invention may be employed in a 3GPP network. They may be employed also in other mobile networks such as CDMA, EDGE, UMTS, LTE, LTE-A, GSM, WiFi networks, etc.

A terminal may be a user equipment such as a mobile phone, a smart phone, a PDA, a laptop, a tablet PC, or any other device which may be connected to the respective mobile network.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that exemplary embodiments of the present invention provide, for example a base station such as an eNB, or a component thereof, an apparatus embodying the same, a method for controlling and/or operating the same, and computer program(s) controlling and/or operating the same as well as mediums carrying such computer program(s) and forming computer program product(s). Furthermore, according to the above description, it should thus be apparent that exemplary embodiments of the present invention provide, for example a gateway such as a LGW, PGW, or SGW or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
at least one processor; and
at least one memory including computer program code;
the at least one memory and the computer program code configured to, with the at least one processor, cause the apparatus at least to
monitor if a packet for a terminal without a base station context is received from a user plane device;
initiate a network triggered service request if the packet is received; and at least one of
relay charging information related to the terminal between the user plane device and a charging device;
relay enforcement information related to the terminal between the user plane device and an enforcement device,
wherein the at least one memory and the computer program code are further configured to, with the at least one processor, cause the apparatus at least to
monitor if a request to modify a bearer is received from a mobility management entity, wherein the request to modify comprises a first address of a base station to which a handover of the terminal took place,
request, if the request monitoring means monitors that the request to modify is received, a path update from a control device, wherein the request for path update comprises a second address of the base station, and the second address is based on the first address,
provide to the mobility management entity, in response to the request to modify, an address of a mobility anchor, wherein the address of the mobility anchor is based on a third address received from the control device in response to the request for path update,
monitor if an information is received from the mobility management entity that the terminal is in an idle mode,
instruct the control device to remove an address of the terminal from a respective routing table of at least one of the user plane device, the mobility anchor, and another network device,
monitor if the request for path update is received,
inform a first mobility anchor on the second address, wherein the first mobility anchor has the third address, and
provide the third address of the mobility anchor in response to the request for path update.

2. The apparatus according to claim 1, wherein the apparatus is inhibited from providing a gateway user plane functionality including a mobility anchor functionality.

3. The apparatus according to claim 1, wherein the at least one processor and at least one memory are further configured to
calculate a second mobility anchor for the terminal based on the request for path update;
inform at least one of a switch and an edge router; and
provide an address of the second mobility anchor as the third address.

4. The apparatus according to claim 1, wherein the at least one processor and at least one memory are further configured to
determine a route between a device having the second address and an edge router of a network based on a topology of the network, wherein a header information identifies the edge router; and
instruct a routing device on the route to set up a routing table such that it routes a packet comprising the header information according to the determined route.

5. The apparatus according to claim 1, wherein the control device is implemented as a software defined networking control device.

6. A method, comprising:
monitoring if a packet for a terminal without a base station context is received from a user plane device;
initiating a network triggered service request if the packet is received; and at least one of
relaying charging information related to the terminal between the user plane device and a charging device;
relaying enforcement information related to the terminal between the user plane device and an enforcement device, wherein the method further comprises
- monitoring if a request to modify a bearer is received from a mobility management entity, wherein the request to modify comprises a first address of a base station to which a handover of the terminal took place,
- requesting, if it is monitored that the request to modify is received, a path update from a control device, wherein the request for path update comprises a second address of the base station, and the second address is based on the first address,
- first providing, to the mobility management entity, in response to the request to modify, an address of a mobility anchor, wherein the address of the mobility anchor is based on a third address received from the control device in response to the request for path update,
- monitoring if an information is received from the mobility management entity that the terminal is in an idle mode,
- instructing the control device to remove an address of the terminal from a respective routing table of at least one of the user plane device, the mobility anchor, and another network device,
- monitoring if the request for path update is received,
- informing a first mobility anchor on the second address, wherein the first mobility anchor has the third address, and
- second providing the third address of the mobility anchor in response to the request for path update.

7. The method according to claim 6, wherein the method further comprises inhibiting an apparatus performing the method from providing a gateway user plane functionality including a mobility anchor functionality.

8. The method according to claim 6, further comprising
- calculating a second mobility anchor for the terminal based on the request for path update;
- informing at least one of a switch and an edge router; and
- second providing an address of the second mobility anchor as the third address.

9. The method according to claim 6, further comprising
- determining a route between a device having the second address and an edge router of a network based on a topology of the network, wherein a header information identifies the edge router; and
- instructing a routing device on the route to set up a routing table such that it routes a packet comprising the header information according to the determined route.

10. The method according to claim 6, wherein at least one of the calculating, informing, second providing, determining, and instructing is implemented as a software defined networking.

11. A computer program product embodied on a non-transitory computer-readable medium, said product comprising a set of instructions which, when executed on an apparatus, is configured to cause the apparatus to carry out the method according to claim 1.

* * * * *